(12) United States Patent
Xu et al.

(10) Patent No.: US 9,723,558 B2
(45) Date of Patent: Aug. 1, 2017

(54) METHOD AND APPARATUS FOR SIGNALING IN DENSE NETWORK OPERATIONS

(71) Applicant: QUALCOMM Incorporated, San Diego, CA (US)

(72) Inventors: Hao Xu, San Diego, CA (US); Durga Prasad Malladi, San Diego, CA (US); Yongbin Wei, San Diego, CA (US); Peter Gaal, San Diego, CA (US); Wanshi Chen, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 13/802,637

(22) Filed: Mar. 13, 2013

(65) Prior Publication Data
US 2013/0286848 A1    Oct. 31, 2013

Related U.S. Application Data

(60) Provisional application No. 61/639,778, filed on Apr. 27, 2012.

(51) Int. Cl.
*H04L 12/16*    (2006.01)
*H04W 52/02*    (2009.01)

(52) U.S. Cl.
CPC ... *H04W 52/0225* (2013.01); *H04W 52/0206* (2013.01); *H04W 52/0209* (2013.01); *H04W 52/0216* (2013.01)

(58) Field of Classification Search
CPC ... Y02B 60/50; Y02B 60/41; H04W 52/0206; H04W 52/0209; H04W 52/0225; H04W 52/0216
See application file for complete search history.

(56) References Cited

U.S. PATENT DOCUMENTS 7,860,462 B2    12/2010    Sarkkinen et al.
8,018,884 B2    9/2011    Lee et al.
(Continued)

FOREIGN PATENT DOCUMENTS

EP    2157824 A1    2/2010
EP    2207277 A1    7/2010
(Continued)

OTHER PUBLICATIONS

3GPP: "3rd Generation Partnership Project; Technical Specification Group Radio Access Network; Evolved Universal Terrestrial Radio Access (E-UTRA); Relay architectures for E-UTRA (LTE-Advanced) (Release 9)", Apr. 21, 2010 (Apr. 21, 2010), XP055003270.
(Continued)

*Primary Examiner* — Shripal Khajuria
(74) *Attorney, Agent, or Firm* — Arent Fox LLP

(57) ABSTRACT

A method, an apparatus, and a computer program product for wireless communication are provided. The apparatus transitions to a dormant state and transmits a very low duty cycle signal (LDCS) while in the dormant state. The apparatus may transmit an LDCS configuration to a second entity, the second entity being one of an LPN that is not in a dormant state and a macro cell. The apparatus may further monitor for a RACH messages at a predetermined RACH delay after transmitting the LDCS. The apparatus may transition to a DRX/DTX mode. The DRX/DTX mode may be matched to at least one connected UE.

72 Claims, 20 Drawing Sheets

(56) References Cited

U.S. PATENT DOCUMENTS

| | | |
|---|---|---|
| 9,113,412 B2 | 8/2015 | Malladi et al. |
| 9,379,856 B2 | 6/2016 | Khoryaev et al. |
| 2007/0293157 A1 | 12/2007 | Haartsen et al. |
| 2008/0198795 A1 | 8/2008 | Kim et al. |
| 2009/0175186 A1* | 7/2009 | Du et al. ............ 370/252 |
| 2009/0280819 A1 | 11/2009 | Brisebois et al. |
| 2010/0056177 A1 | 3/2010 | Kojima |
| 2010/0067421 A1* | 3/2010 | Gorokhov et al. ...... 370/311 |
| 2010/0080166 A1 | 4/2010 | Palanki et al. |
| 2010/0167743 A1* | 7/2010 | Palanki et al. .......... 455/436 |
| 2010/0195607 A1 | 8/2010 | Lee et al. |
| 2010/0203854 A1 | 8/2010 | Yu et al. |
| 2010/0238824 A1* | 9/2010 | Farajidana et al. ...... 370/252 |
| 2010/0260126 A1 | 10/2010 | Ulupinar et al. |
| 2010/0265913 A1 | 10/2010 | Gorokhov et al. |
| 2010/0309849 A1 | 12/2010 | Park et al. |
| 2010/0323717 A1 | 12/2010 | Agashe et al. |
| 2011/0182213 A1 | 7/2011 | Forssell et al. |
| 2011/0243075 A1 | 10/2011 | Luo et al. |
| 2012/0052796 A1* | 3/2012 | Takano ........... H04B 7/15557 455/7 |
| 2012/0077486 A1 | 3/2012 | Park et al. |
| 2012/0122455 A1 | 5/2012 | Frenger et al. |
| 2012/0129517 A1 | 5/2012 | Fox et al. |
| 2012/0149358 A1 | 6/2012 | Lim |
| 2012/0155306 A1 | 6/2012 | Kim et al. |
| 2012/0155355 A1 | 6/2012 | Kwon et al. |
| 2012/0157078 A1 | 6/2012 | Nigam et al. |
| 2012/0176939 A1 | 7/2012 | Qu et al. |
| 2012/0263118 A1 | 10/2012 | Love et al. |
| 2012/0307780 A1 | 12/2012 | Mochizuki et al. |
| 2012/0315841 A1 | 12/2012 | Zhou et al. |
| 2013/0064173 A1 | 3/2013 | Sivavakeesar et al. |
| 2013/0137432 A1 | 5/2013 | Wong |
| 2013/0286912 A1 | 10/2013 | Xu et al. |
| 2013/0286928 A1 | 10/2013 | Xu et al. |
| 2014/0011543 A1 | 1/2014 | Li et al. |
| 2017/0048796 A1 | 2/2017 | Xu et al. |
| 2017/0086140 A1 | 3/2017 | Xu et al. |
| 2017/0127454 A1 | 5/2017 | Xu et al. |

FOREIGN PATENT DOCUMENTS

| | | |
|---|---|---|
| EP | 2369892 A1 | 9/2011 |
| EP | 2387279 A1 | 11/2011 |
| GB | 2479904 A | 11/2011 |
| JP | H02126736 A | 5/1990 |
| JP | 2010081282 A | 4/2010 |
| JP | 2011029851 A | 2/2011 |
| WO | 2009050794 A1 | 4/2009 |
| WO | 2010030952 A2 | 3/2010 |
| WO | 2010093296 A1 | 8/2010 |
| WO | 2011021814 A2 | 2/2011 |
| WO | 2011099509 A1 | 8/2011 |
| WO | 2011102772 A1 | 8/2011 |
| WO | 2011125849 A1 | 10/2011 |
| WO | 2011136152 A1 | 11/2011 |

OTHER PUBLICATIONS

International Search Report and Written Opinion—PCT/US2013/038472—ISA/EPO—Jul. 26, 2013.

LG: "LTE-Advanced", Nov. 4, 2010 (Nov. 4, 2010), XP055020579.

Wirth T., et al., "LTE-Advanced Relaying for Outdoor Range Extension", Vehicular Technology Conference Fall (VTC2009—Fall), 2009 IEEE 70th, IEEE, Piscataway, NJ, USA, Sep. 20, 2009 (Sep. 20, 2009), pp. 1-4, XP031600331, ISBN: 978-1-4244-2514-3, the whole document.

Mediatek Inc: "Aspects of Potentioal Cost Saving for LTE MTC Devices and System Impact Discussion[online]," 3GPP TSG-RAN WG1#66b R1-113054, Oct. 14, 2011, URL:http://www.3gpp.org/ftp/tsg_ran/WG1_RL1/TSGR1_66b/Docs/R1-113054.zip, 5 pages.

Motorola: UE Impact of Network Energy Savings[online], 3GPP TSG-RAN WG1#60 R1-101132, Feb. 26, 2010, URL:http://www.3gpp.org/ftp/tsg_ran/WG1_RL1/TSGR1_60/Docs/R1-101132.zip, 3 pages.

\* cited by examiner

METHOD AND APPARATUS FOR SIGNALING IN DENSE NETWORK OPERATIONS

CROSS-REFERENCE TO RELATED APPLICATION

This application claims the benefit of U.S. Provisional Application Ser. No. 61/639,778, entitled "METHOD AND APPARATUS FOR SIGNALING IN DENSE NETWORK OPERATIONS" and filed on Apr. 27, 2012, which is expressly incorporated by reference herein in its entirety.

BACKGROUND

Field

The present disclosure relates generally to communication systems, and more particularly, to a method and apparatus for energy efficient signaling and operation in densely deployed networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Dense network deployment can significantly improve wireless system capacity. In such dense network deployment, Low Power Nodes (LPN) provide service to other User Equipment (UE) in their vicinity. An LPN may comprise a UE relay, a Remote Radio Head (RRH), a pico cell, femto cell, etc. A pico cell has a power of approximately 30 dBm, and a UE relay has a power of approximately 23 dBm. Thus, a "low" power node has a power that is less than approximately 46 dB, which is the typical transmit power of a Macro cell. A UE relay is a UE that has both a backhaul link, e.g., to an eNB or other LPN, as well as an access link for another UE. Dense deployments may include a large number of LPNs.

Although the use of LPNs can greatly increase the capacity of the wireless system, such operations also place a strain on the battery of the LPN. Thus, there exists a need to ensure energy efficient operation of LPNs involved in such dense network deployment.

SUMMARY

In order to overcome the problems associated with dense network deployment, aspects presented herein enable an LPN, e.g., a UE relay, involved in dense network deployment to remain dormant whenever relay/LPN operation is not required. With a densely deployed network, it is likely that some of the LPNs will have periods without any associated users. For example, an LPN might not have any connected users or none of the connected users may be active. In this circumstance, it is advantageous to reduce the transmit power or duty cycle of the LPN in order to conserve energy. Aspects presented herein provide signaling and procedures to enable such a reduction in transmit power or duty cycle.

In an aspect of the disclosure, an apparatus, method, and a computer program product are provided for wireless communication at a UE in a dense network deployment. The apparatus receives a very low duty cycle signal (LDCS) configuration for a UE relay from a second entity. A very low duty cycle signal comprises a signal having a duty cycle with an interval of hundreds of ms, a few seconds or even more depending on how much power saving is desired. The second entity may be another non-dormant LPN or a cell, e.g. a Macro cell, Pico cell or RRH. After receiving the LDCS configuration, the apparatus monitors for an LDCS from the UE relay based on the received LDCS configuration.

Among others, the format of the LDCS may comprise at least one of a special synchronization signal format, an enhanced cell-specific reference signal (CRS) format, a coded signal transmission format, a channel state information reference signal (CSI-RS) format, and a system information block (SIB) format. For example, the format of the LDCS may comprise an SIB format having a reduced amount of information, wherein the LDCS comprises at least one of SIB information and a global cell ID.

The LDCS configuration received from the second entity may be comprised in any of, among others, a primary synchronization signal (PSS) transmission, a secondary synchronization signal (SSS) transmission, a physical broadcast channel (PBCH) transmission, an SIB transmission, and a master information block (MIB) transmission from the second entity.

The UE may receive LDCS configurations for a plurality of LPNs from the second entity, the plurality of LPNs including the UE relay. The LPNs may comprise, e.g., a UE relay, an RRH, or another type of LPN. The apparatus may monitor a plurality of LDCSs based on the received LDCS configurations. When the apparatus determines a need to connect to an LPN, the apparatus selects an LPN among a plurality of LPNs.

In another aspect of the disclosure, an apparatus, method, and a computer program product are provided for wireless communication of an LDCS configuration for a UE relay from a second entity. Similar to the first aspect, the second entity may be another LPN or a cell. The apparatus identifies a UE relay and transmits an LDCS configuration of the UE relay. The apparatus may receive LDCS information for the UE relay, wherein the LDCS configuration is transmitted after the LDCS information is received. Alternatively, the apparatus may determine the LDCS configuration itself and thereafter transmit the LDCS configuration to the UE relay. The LDCS configuration transmitted from the second entity may comprise at least one of a PSS, an SSS, a PBCH, an SIB, and an MIB, among others.

In another aspect of the disclosure, an apparatus, method, and a computer program product are provided for wireless communication at a UE relay. In this aspect, the apparatus transitions to a dormant state and transmits an LDCS while in the dormant state.

Aspects may further include transmitting an LDCS configuration to a second entity, the second entity being one of an LPN that is not in a dormant state and a Macro cell. The LDCS configuration may comprise, e.g., transmit power information for the LDCS.

Aspects may further include monitoring for a RACH message at a predetermined RACH delay after transmitting the LDCS. The predetermined RACH delay may be comprised in the transmitted LDCS. The LDCS may further comprise RACH configuration, wherein the RACH configuration relates to a global cell ID. The LDCS may further comprise at least one of backhaul quality information and loading capability information for the UE relay.

The transition to the dormant state may be made from an active state, and the transition may be performed based at least in part on an expiration of a predetermined period of time.

Aspects may further include monitoring at least one connected UE and determine whether any connected UE is active. The transition to the dormant state may be performed when no UEs are determined to be active for the predetermined period of time.

Aspects may further include determining that no connected UEs of the UE relay are active, and when it is determined that no connected UEs of the UE relay are active, transitioning to a discontinuous reception and transmission (DRX/DTX) mode, wherein the transition to the dormant state is performed from the DRX/DTX mode.

Aspects may further include determining that no connected UEs are active, wherein the UE relay transitions to the dormant state at the predetermined period of time after determining that no connected UEs are active.

Aspects may further include any of matching the DRX/DTX mode to a DRX/DTX mode for at least one connected UE, matching the DRX/DTX mode to a DRX/DTX mode for plurality of connected UEs, wherein the DRX/DTX mode for each of the connected UEs is different, and matching the DRX/DTX mode to a DRX/DTX mode for a plurality of connected UEs, wherein the DRX/DTX mode for each of the connected UEs is the same. The DRX/DTX mode may comprise a configuration for an access link of the UE relay and a configuration for a backhaul link of the UE relay. The configuration for the access link of the UE relay may match the configuration of the backhaul link of the UE relay. The configuration for the access link of the UE relay may be different than the configuration of the backhaul link of the UE relay.

DETAILED DESCRIPTION

Figure 1:
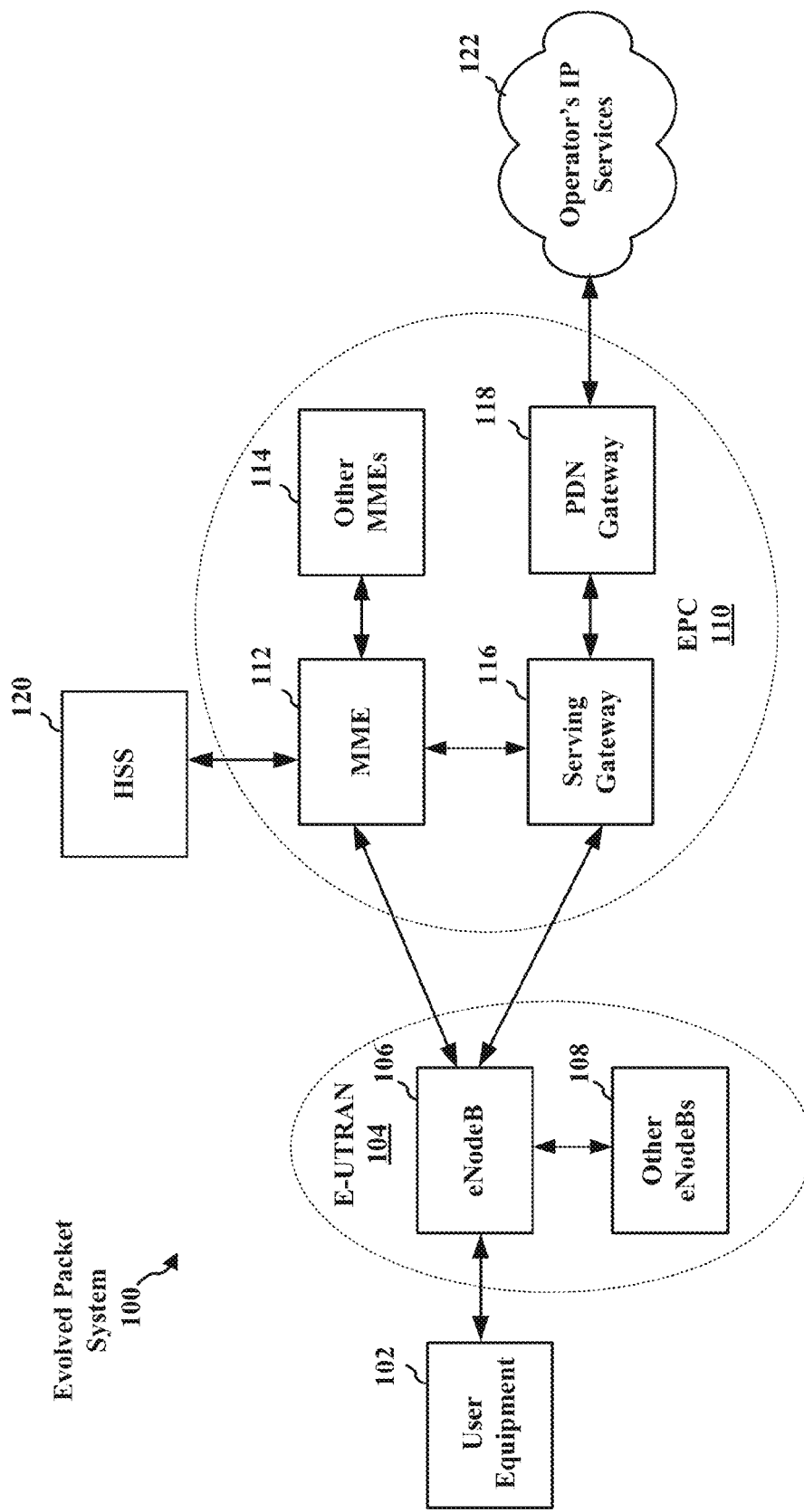
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
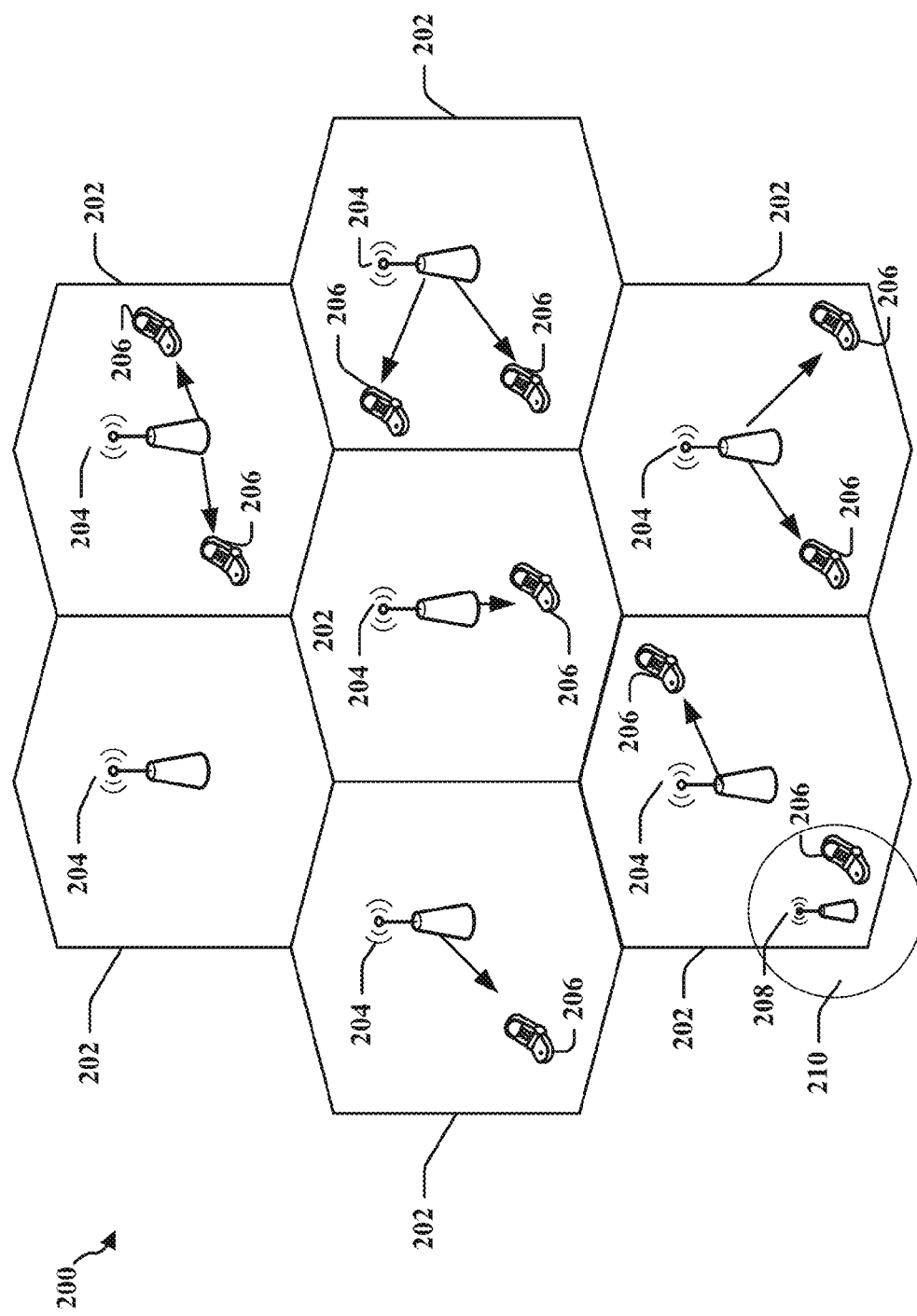
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
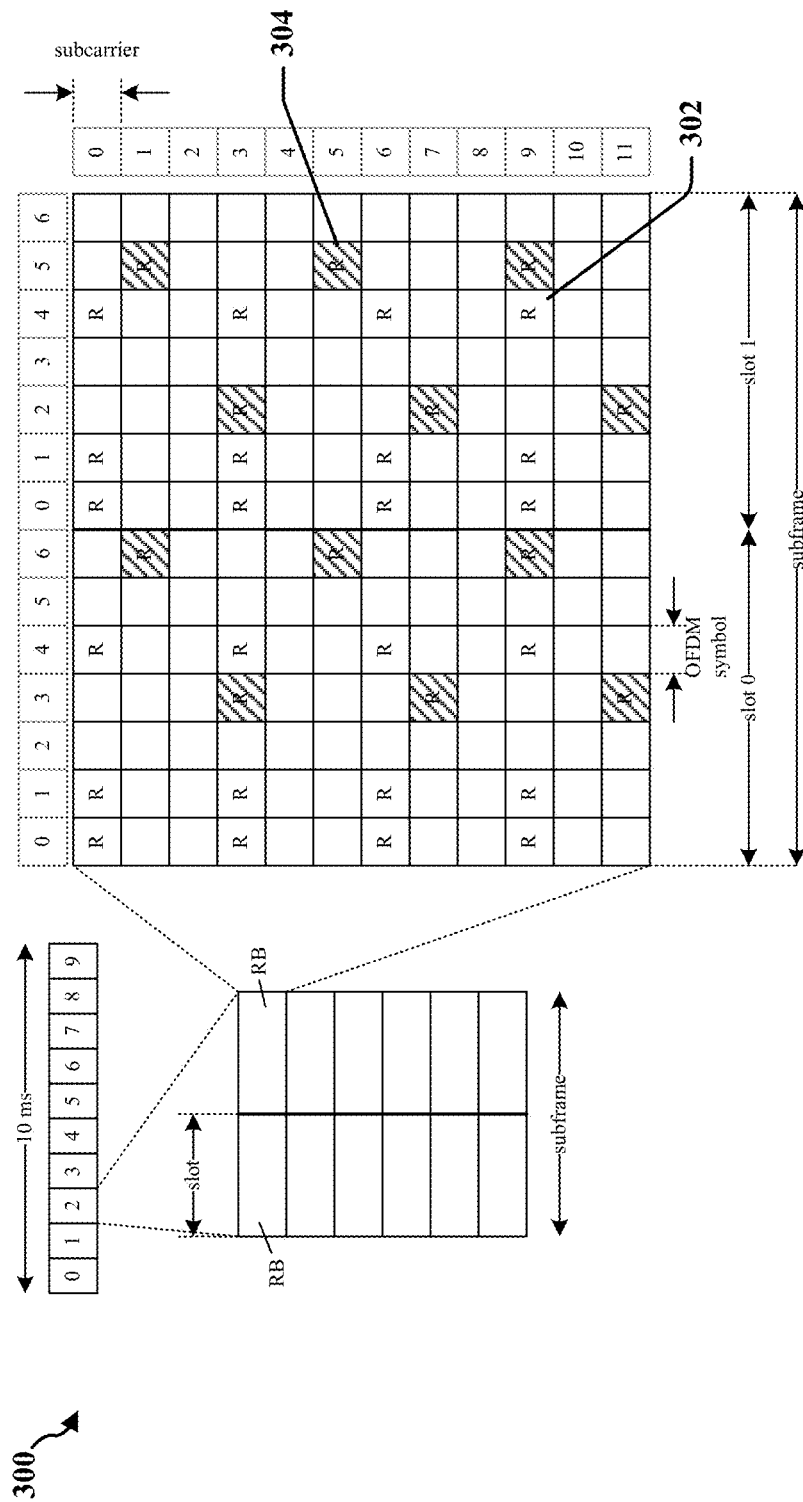
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
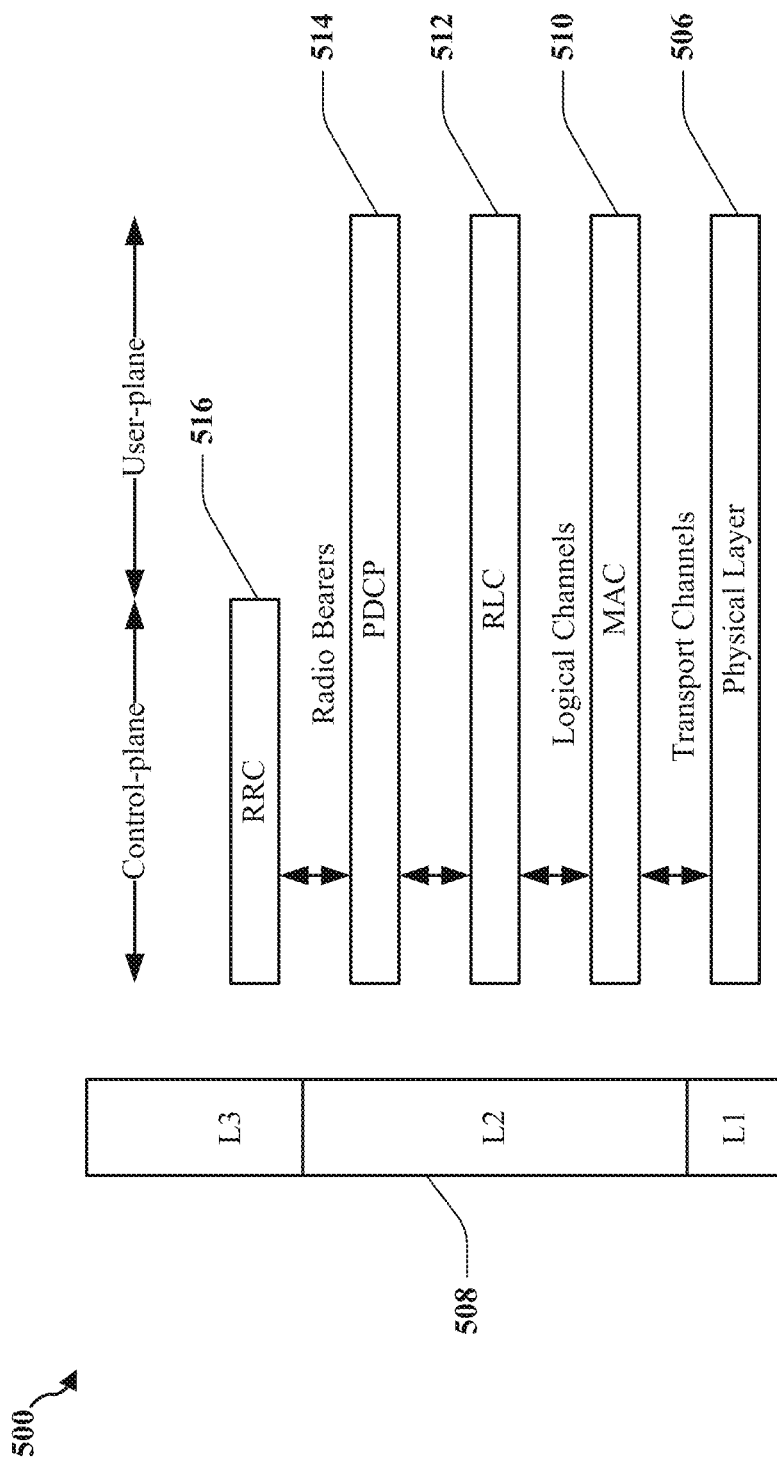
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
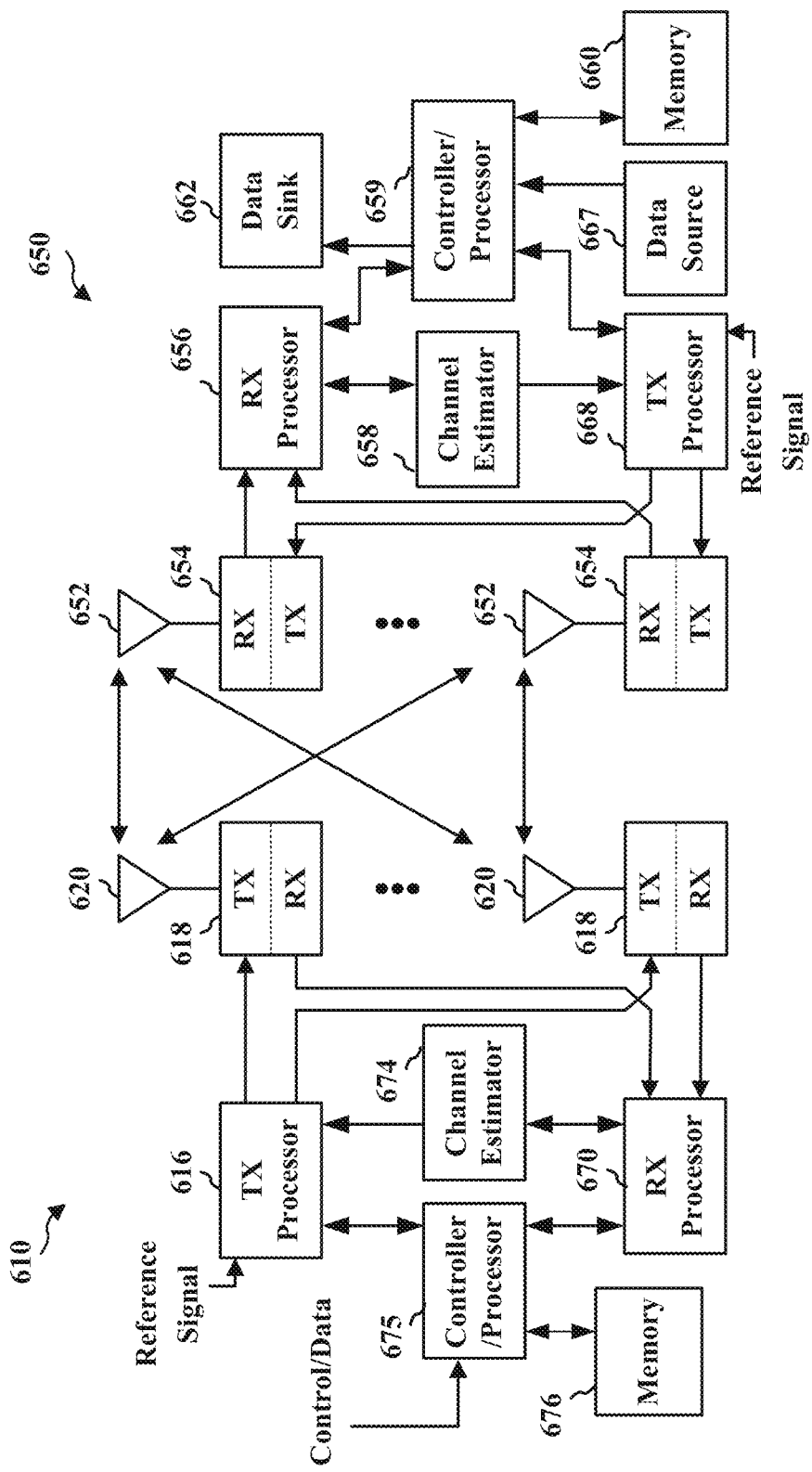
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
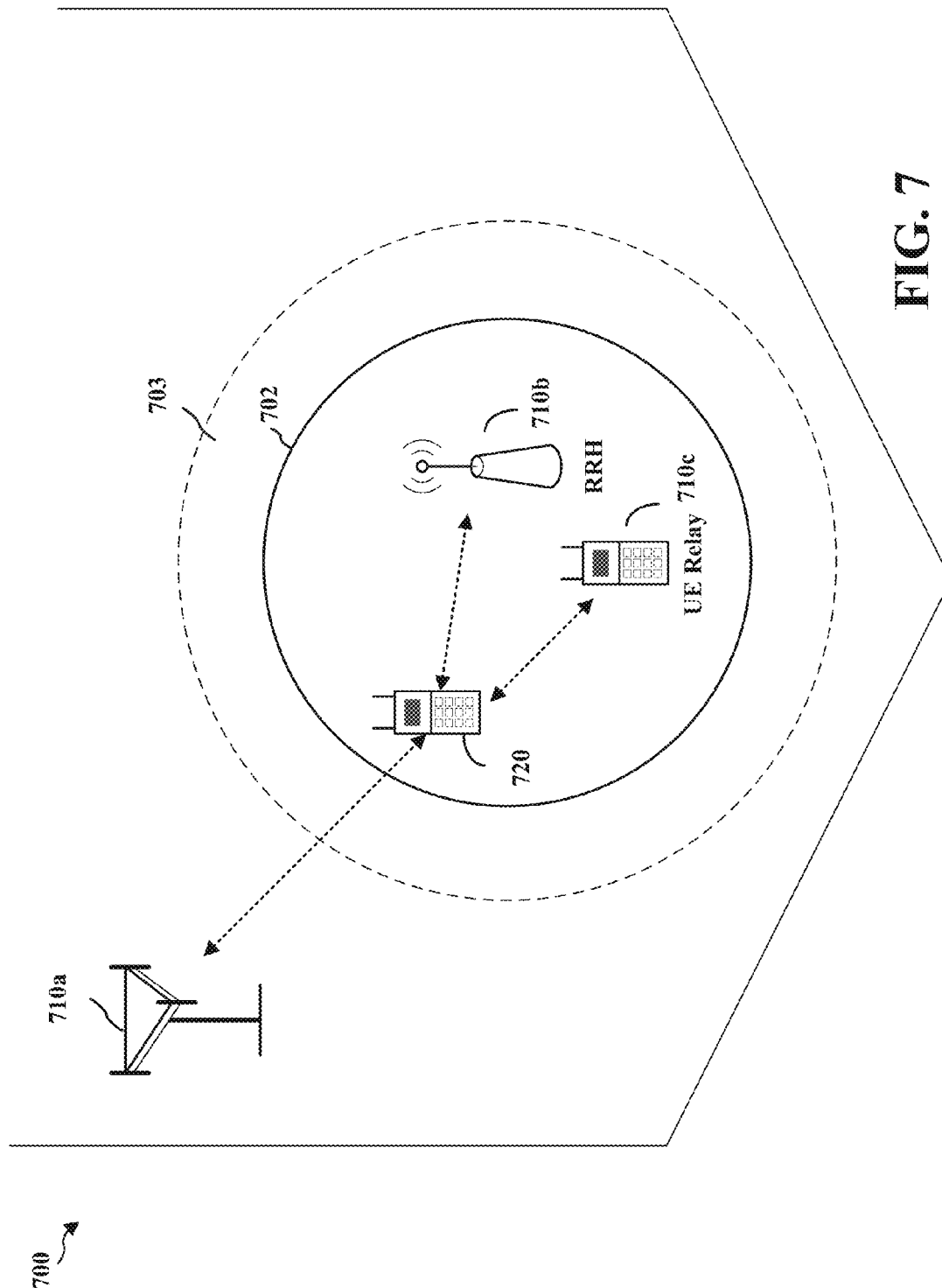
FIG. 7 is a diagram illustrating a range expanded cellular region in a heterogeneous network.

FIG. 7 is a diagram 700 illustrating a densely deployed network. An LPN, e.g., a lower power class eNB such as RRH 710b or UE Relay 710c, or Femto cells, or pico cells can provide an access link for UE 720 in addition to eNB 710a.

The LPN may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Through the use of LPNs providing service to UEs, dense network deployment improves wireless system capacity. However, among other issues, such additional use of an LPN places an additional burden on its battery and power consumption.

In order to ensure energy efficient operation of LPNs involved in dense network deployment, the LPN should remain dormant whenever relay operation is not required. For example, in a densely deployed network, a number of LPNs will likely not have any connected and/or active users associated with them for certain periods of time. For a UE relay, it is possible at times that no other UEs will be within the vicinity of the UE relay. At these times, the LPN can enter a dormant mode, or a dormant state, during which the LPN transmits only an LDCS. A very low duty cycle signal comprises a signal having a duty cycle with an interval of at least hundreds of ms. The interval may be set at a few seconds or even more depending on how much power saving is desired. The sparse transmission reduces the amount of DL interferences.

Among others, the format of the LDCS may comprise at least one of a special synchronization signal format, e.g., PSS/SSS, an enhanced CRS format, a coded signal transmission format, a CSI-RS format, and a SIB format.

For example, the format of the LDCS may comprise an SIB format having a reduced amount of information, wherein the LDCS comprises at least one of SIB information and a global cell ID. As another example, the enhanced CRS format for an LDCS signal may have a low duty cycle and may span, e.g., five RB, 25 resource blocks (RB), the entire system bandwidth, etc. As another example, the LDCS may comprise a coded signal transmission having a low re-use preamble with encoded information inside it. Such a coded signal transmission may be similar to a low reuse preamble, such as used with D2D. The information encoded in the preamble may include, e.g., a global cellular ID, an RACH delay in relation to the LDCS, etc.

Figure 8:
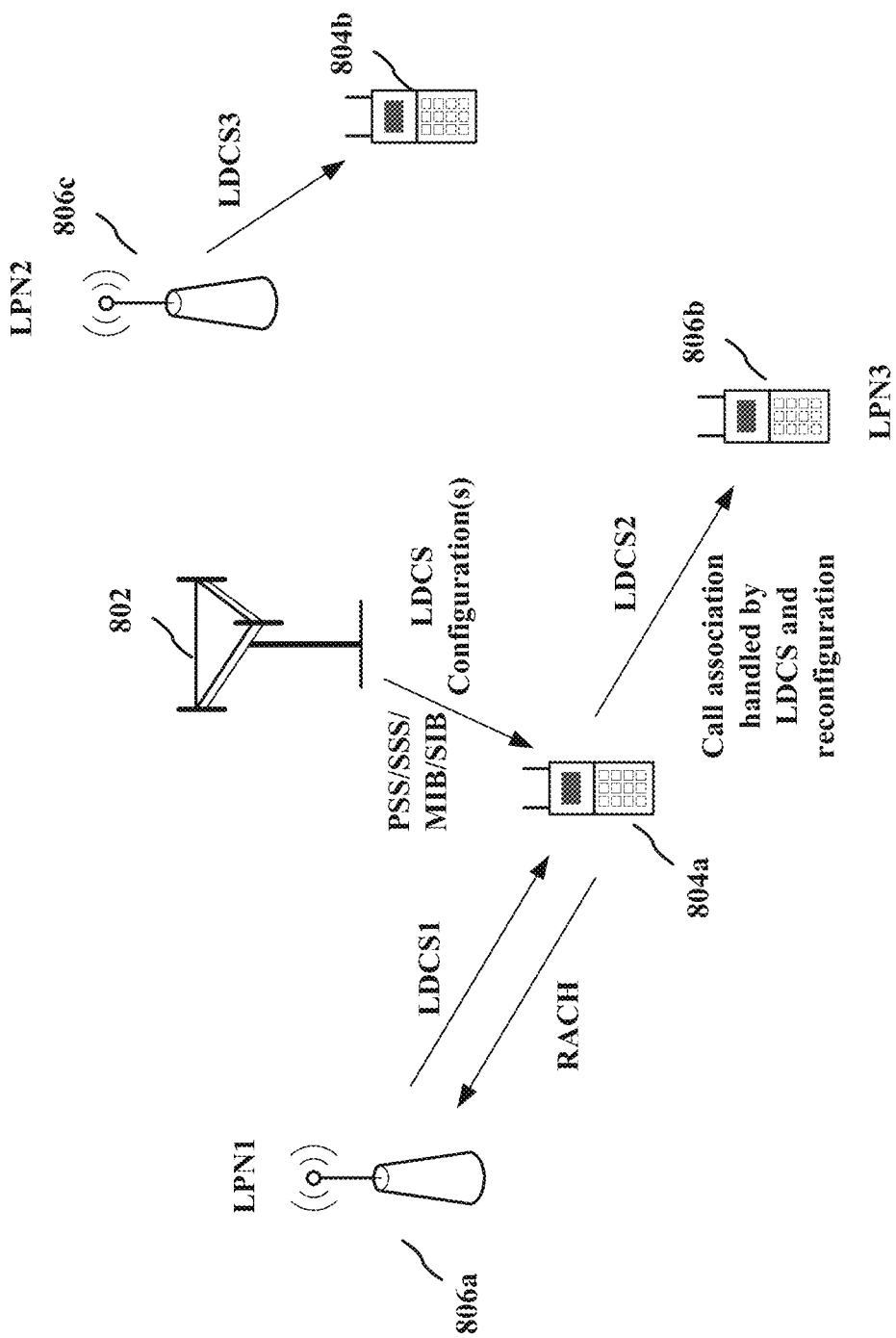
FIG. 8 is a diagram illustrating a densely deployed network in accordance with aspects presented herein.

FIG. 8 illustrates LPN1 806a, LPN2 806b, and LPN3 806c in a densely deployed network overlapping with cell 802.

Figure 9:
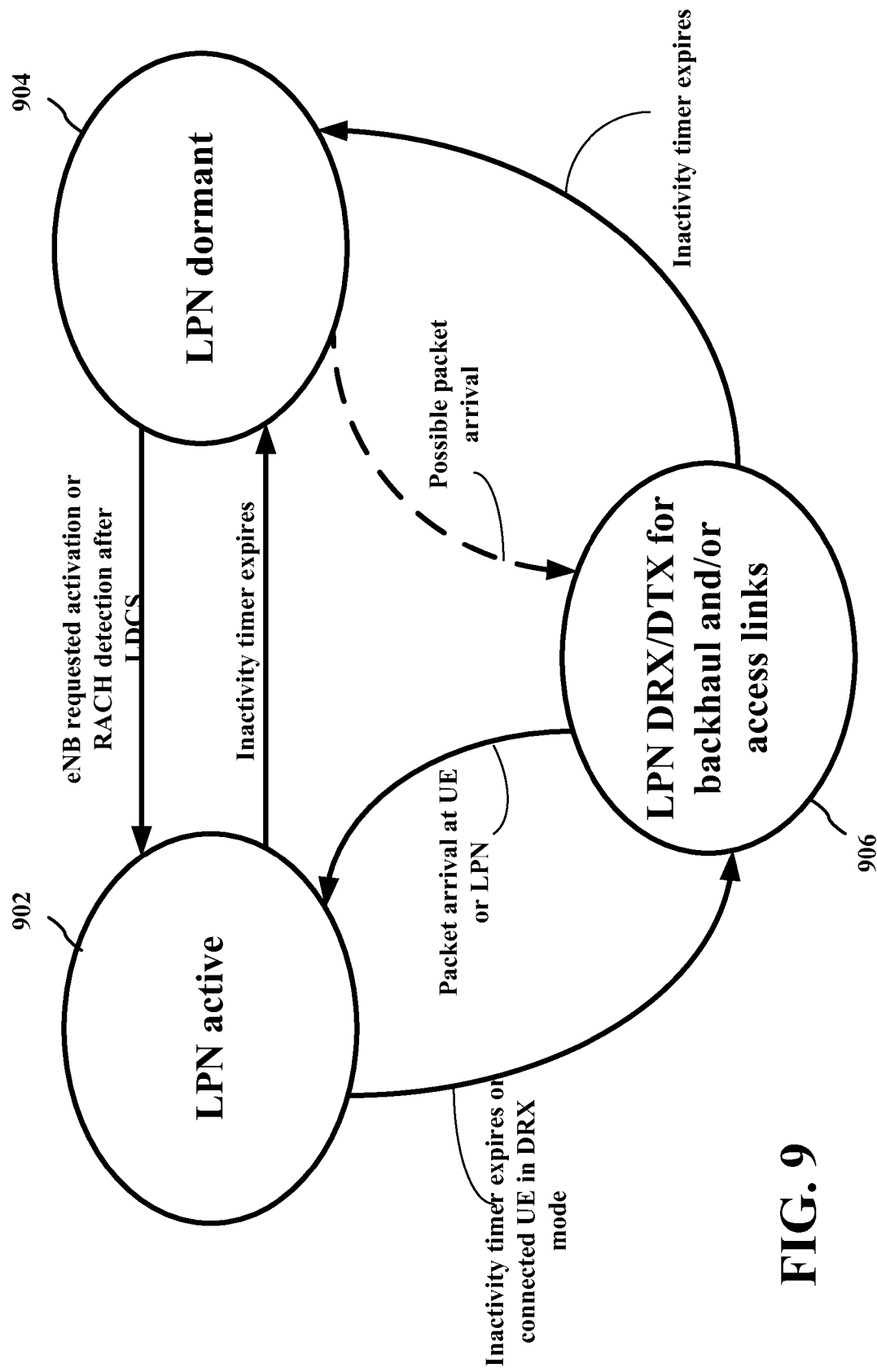
FIG. 9 is a chart illustrating potential states of an LPN in accordance with aspects presented herein.

An LPN 806a-c may have at least two different states, as illustrated in FIG. 9. The LPN may have at least one connected state, such as connected active state 902, and a dormant state 904. During the active state, the LPN has active UEs to serve. The LPN may transmit all necessary signals for data communications, such as demodulation reference signals (DMRS) for demodulation, CSI-RS, CRS, CSI, PSS/SSS for synchronization, other possible uplink signals, and possibly special synchronization signal. During an active state for a UE relay, the UE relay has at least one UE connected in active transmission. The UE relay may continuously monitor an UL and transmit any necessary signals on the DL.

During its dormant state 904, the LPN may transmit only LDCS signals. A dormant UE relay does not have any UEs associated with it. The dormant UE relay merely transmits a LDCS or does not transmit a signal at all, if it does not want to serve as a UE relay. An LDCS comprises an interval of approximately hundreds of ms or more, e.g., on the interval of a second or more. For example, an LDCS may be on an interval of approximately 300 ms. UEs in the proximity may detect the LDCS in order to identify the presence of the nearby LPN. This enables the UE to initiate the connection to the LPN while the LPN is in the dormant state. By allowing the UE to remain in the dormant state without a loss in its ability to receive an indication of a need for service from a UE enables power efficiency for the operation of the LPN. In this way, the LPN avoids interference and wasting power by unnecessarily broadcasting signaling with a higher duty cycle when there are no active UEs within its vicinity.

The LPN may also include a third state, also referred to as a connected Discontinuous Reception and Transmission (DRX/DTX) state 906. A DRX/DTX state for a UE relay, e.g., may comprise the UE relay being connected to at least one UE, where the UE is in a DRX mode. The LPN enters the DRX/DTX state when there is a reduced need for access. For example, the LPN may monitor its connected users to determine whether any of them are active. If there are no users, or no active users, the LPN may transition to the DRX/DTX state before transitioning to the dormant state. Likewise, if the LPN determines that it is associated with a limited number of UEs and the limited number of UEs are in a DRX state, then the LPN may enter a DTX/DRX state. The LPN may match its DRX/DTX cycle with the UE's DRX cycle in order to maximize the power efficiency of the LPN in this state.

While a DRX/DTX state may not be critical for an RRH, a pico cell, or other LPN that plugs into the wall, this state may be very important for a UE relay in order to extend its battery life.

As illustrated in FIG. 9, the LPN may transition from dormant 904 to active 902 in response to an eNB requested activation and/or based on receiving an RACH message from a UE in response to the LDCS.

The LPN may automatically transition from the active state 902 into a dormant state 904. For example, the LPN may continuously monitor its connected users while in the active state. When certain criteria are met, e.g., none of the users being active, the LPN may transition into a dormant state upon the expiration of an inactivity timer. Among others, the criteria for such a transition may be based on whether the LPN has any connected users, whether any of the connected users are active, whether the LPN has more than a predetermined number of connected and/or active users, and a state of the battery of the LPN. For example, if the LPN does not have enough connected and/or active users, the LPN may hand its current users over to another LPN in order to transition to a dormant state. The LPN may also hand its current users over to another LPN and transition to a dormant state when its battery power drops below a certain level.

The LPN may automatically transition from the active state 902 to a DRX/DTX state. Similar to the automatic transition from active to dormant, in this case the LPN may transition into a DRX/DTX state upon the expiration of an inactivity timer after a certain criteria is met. Similar criteria may be applied as for the transition from the active state directly to the dormant state. In addition, the criteria may include whether connected users are in a DRX mode. The DRX/DTX state is an intermediate state that uses less power than the active state, yet more resources than the dormant state.

As illustrated in FIG. 9, the LPN might transition from DRX/DTX state 906 directly back to an active state 902, e.g., if a packet arrives at a user or the LPN. The LPN may transition from the DRX/DTX state to the dormant state, e.g., upon the expiration of another inactivity timer.

Also illustrated in FIG. 9, the LPN may transition from the dormant state 904 to the intermediate DRX/DTX state 906, e.g., upon a possible packet arrival.

Separate DRX and DTX configurations may be applied for an access link and a backhaul link of the LPN. As the LPN may handle multiple users on separate access links and a single backhaul, this enables an increased periodicity for the DRX/DTX on the access link in order to handle the multiple users. Thus, the LPN may transition into s DRX/DTX mode separately for a backhaul link and an access link. The LPN may transition into a DRX/DTX state for one or both links. Furthermore, the DRX/DTX configurations for both links may have different configurations.

The DRX/DTX configuration for the access link and the backhaul link may be matched in order to preserve energy. This enables the LPN to communicate with both the UE and a base station using the same periodicity. Likewise, this configuration may be matched to a connected UE's DRX/DTX.

Figure 10:
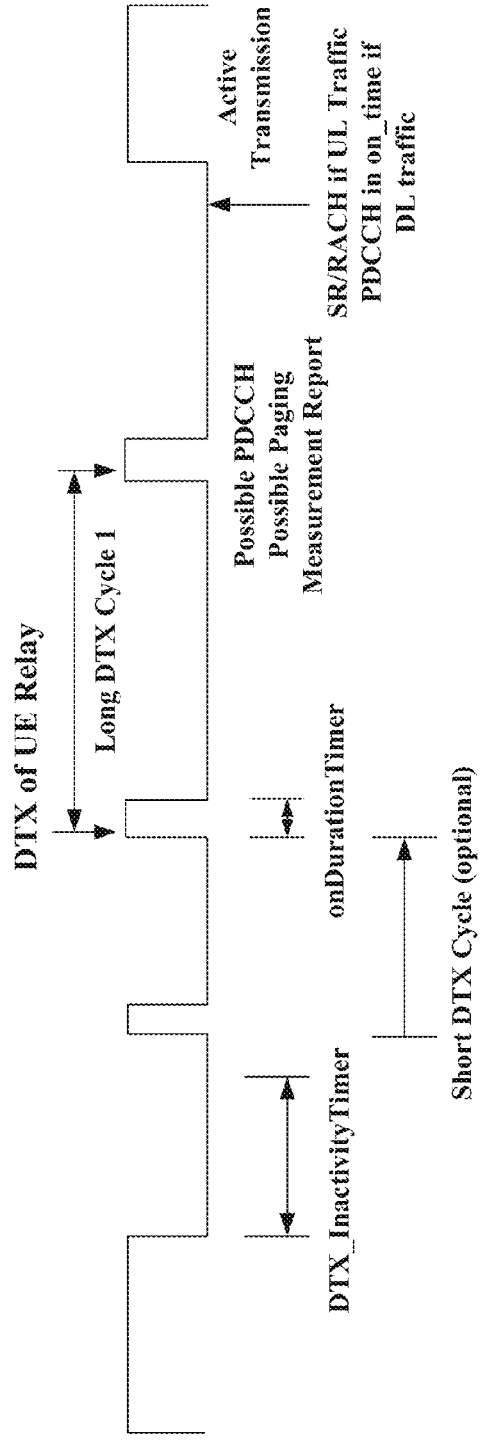
FIG. 10 is a diagram illustrating aspects of DRX/DTX matching.
Figure 11:
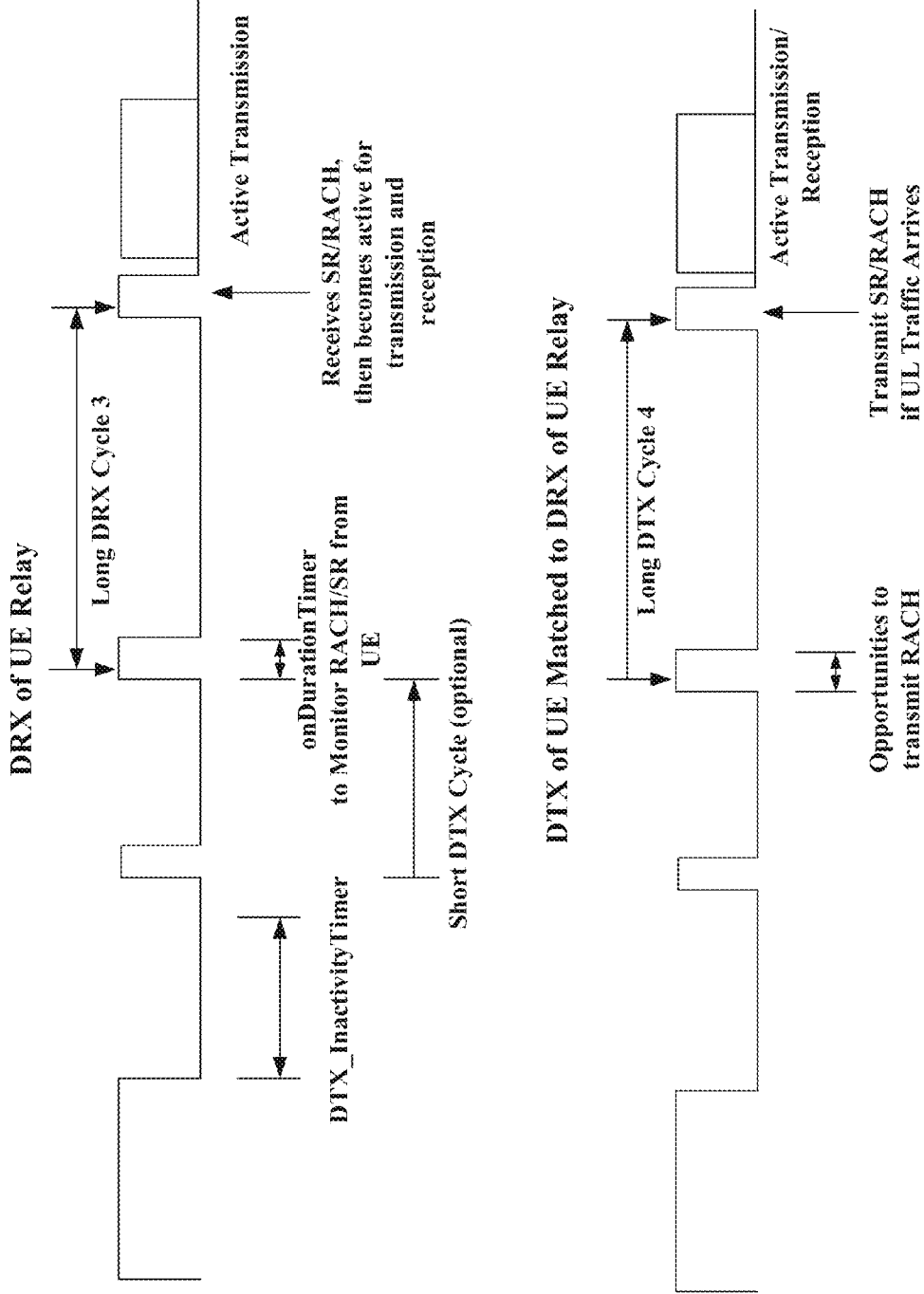
FIG. 11 is a diagram illustrating aspects of DRX/DTX matching.

For example, FIG. 10 illustrates the DTX operation for an LPN being matched to a DRX of a UE. Similarly, FIG. 11 illustrates the DRX operation of the LPN being matched to the DTX of a UE.

Additionally, a cell, such as a macrocell may have a different DRX/DTX configuration for multiple LPNs on the backhaul in order to better multiplex different LPNS. For example, the macrocell may serve multiple UEs, UE relays, and other LPNs. The macrocell may have a different configuration for each of these types of users in order to maximize efficiency for each of them.

In order to enable a UE to receive an LDCS, a second entity assists the UE in receiving the LDCS. Among others, the second entity may be another LPN that is not in a dormant state, a cell that is continuously transmitting, and another anchor entity. Although the second entity may also be another type of anchor entity, an example will be described applying a macrocell as the second entity.

As illustrated in FIG. 8, macrocell 802 may transmit an LDCS configuration for each of LPNs 806a-c. The LDCS configuration may comprise, among others, any of PSS, SSS, PBCH, SIB, and MIB. A UE 804a receives the LDCS configuration and uses it to monitor for an LDCS from any of the LPNs to which it is close. While in an idle mode, the UE monitors the LDCS from at least one LPN. The UE may perform procedures similar to cell reselection, as described in Release 8, i.e., it does not connect to any of the LPNs, but merely monitors them.

When the UE determines that it is in need of a data connection, the UE selects an LPN. Once an LPN is selected, the UE transmits an RACH message to the LPN. As the LPN is in a dormant state, the LPN is not continuously monitoring for transmissions from a UE. Thus, the UE needs to transmit the RACH message at a time when the LPN will be monitoring for such messages. Thus, the UE transmits the RACH message at a predetermined amount of time, i.e. a predetermined RACH delay, after receiving the LDCS. After transmitting the LDCS, the LPN will monitor for any RACH messages at the time indicated by the predetermined RACH delay. For example, when the LPN transmits an LDCS at subframe n and has a corresponding RACH delay of K, at time n+K, the LPN will look for an RACH sequence having a particular configuration. At all other times, the LPN may remain dormant. This deterministic delay ensures further power efficiency while maintaining the potential for communication between the LPN and potential users. The RACH delay, K, may be signaled from the macrocell, e.g., along with the LDCS configuration information in an SIB/MIB. The RACH delay, K, and configuration may also be signaled to the user directly from the LPN, such as inside the LDCS. Furthermore, the RACH configuration may be either linked to the global cell ID or specified in LDCS configuration, or directly signaled by LDCS. This will allow the LPN to know that the UE is trying to access this particular LPN rather than any other nearby LPN.

Figure 12:
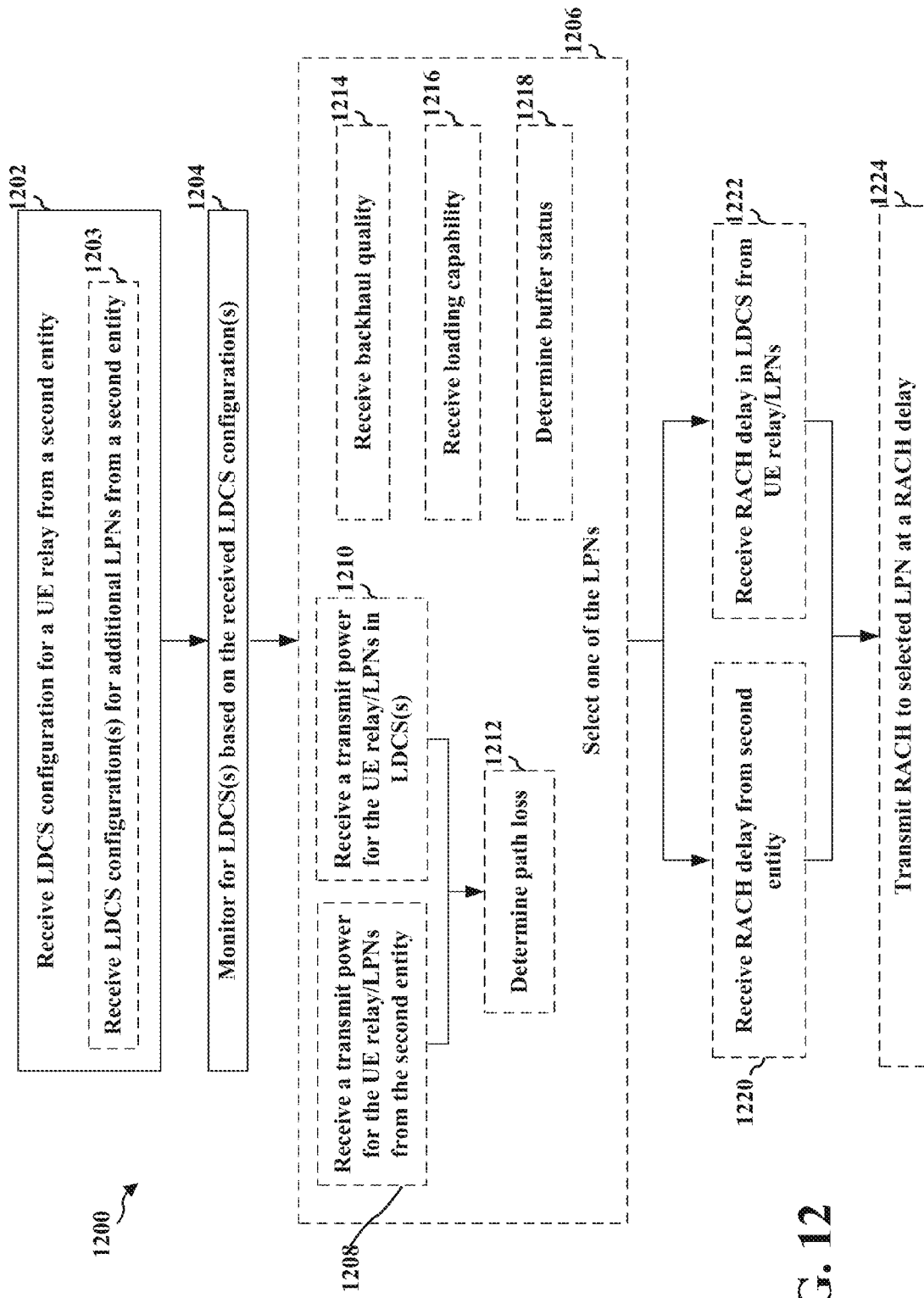
FIG. 12 is a flow chart of a method of wireless communication.

FIG. 12 is a flow chart 1200 of a method of wireless communication at a UE. Optional aspects are illustrated with a dashed line. The method may be performed by a UE. At step 1202, an LDCS configuration is received for a UE relay from a second entity. This step may include receiving a plurality of LDCS configurations from the second entity at 1203, the configurations corresponding to a plurality of LPNs, including the UE relay. An LPN may be any of a UE relay, an RRH, and other types of LPNs. A low power node has a power less than approximately 46 dBm. Among others, the second entity may be an LPN that is not in a dormant state and a cell, such as a Macro cell.

At 1204, the UE monitors for an LDCS from the UE relay based on the received LDCS configuration. If the UE has received LDCS configurations for additional LPNs, the UE may monitor for a plurality of LDCSs corresponding to the UE relay and the additional LPNs. The UE may monitor for the LDCS during an idle mode or an active mode for the UE. This may be performed, e.g., in order to perform a possible data connection through the UE relay.

Among others, the format of the LDCS may comprise at least one of a SSS format, an enhanced CRS signal format, a coded signal transmission format, a CSI-RS format, and a SIB format.

For example, the format of the LDCS may include an SIB format having a reduced amount of information, such as where the LDCS comprises at least one of SIB information and a cell ID. In a typical network multiple SIB, e.g. SIB1, SIB2, . . . , SIBn would be sent, each SIB specifying various aspects, such as cell configuration, neighbor cell information, inter RAT handover information, etc. In contrast, the SIB having a reduced amount of information could comprise a single SIB transmission having all of the essential information for the low power node. Such an SIB transmission may be termed an SIB_lite. Thus, the LDCS in this example could just transmit the SIB_lite information. This essential information comprises the information needed for a UE to access the LPN, such as the information needed to send a RACH message to the LPN.

The format of the LDCS may include an enhanced CRS having a low duty cycle and spans any of five RB, 25 resource blocks (RB) or the entire system bandwidth. The format of the LDCS may include a coded signal transmission having a low re-use preamble comprising encoded information. A typical synchronization signal occurs every 5-10 ms, and an MIB approximately every 40 ms. Thus, a low re-use preamble may be on the order of approximately one hundred ms or above. The format of the LDCS may comprise, e.g., a signal transmission having a low re-use preamble comprises encoded information of a global cell ID and/or RACH configuration.

The LDCS configuration that is sent by the second entity may comprise, among others, a PSS, SSS, PBCH, SIB, and MIB transmission from the second entity.

When the UE receives the LDCS configurations for a plurality of LPNs, the UE monitors for a plurality of LDCSs from the plurality of LPNs based on the received LDCS configurations. This enables the UE to select an LPN from among the plurality of LPNs when it determines a need to connect to an LPN 1206.

The selection 1206 of a particular LPN may be based on a number of considerations.

For example, a node may be selected, e.g., based on the node with the largest received power from its LDCS or based on the node with the smallest path loss. Using the largest receive power, ensures the best serving node from the DL perspective, whereas using the smallest path loss ensures the best serving node from the UL perspective.

In order to measure path loss, the transmit power of the LDCS will need to be signaled to the UE. The UE will then be able to calculate or determine the path loss 1212 based on the signaled transmit power of the LDCS and the received power of the LDCS. This may be signaled from the second entity, e.g., from a macrocell 1208. The macrocell may signal the transmit power along with other LDCS configurations in an SIB/MIB. Alternatively, the transmit power may be signaled as a part of the LDCS from the LPN 1210. For example, the transmit power of the LDCS may be embedded in the coded content of the LDCS or embedded as a portion of the sequence or configuration of the LDCS. Thus, the UE may receive a transmit power for the plurality of LPNs from, e.g., the second entity, the transmit power for each of the LPNs being comprised in the received LDCS configuration for the corresponding LPN. Then, the UE may determine a path loss for each of the plurality of LPNs based at least in part on the received transmit power for the corresponding LPNs. In another aspect, each LDCS may comprise a transmit power for the corresponding LPN, and the UE may determine a path loss for each of the plurality of LPNs based at least in part on the received transmit power for the corresponding LPN.

An LPN may further indicate, among other features, its backhaul quality and/or loading capability. The backhaul quality and/or loading capability may be embedded in the LDCS transmitted by the LPN or signaled together with the LDCS configurations.

Once the backhaul quality and/or loading capability are received by a UE, e.g., at 1214/1216, the UE may use the information in its selection of an LPN. For example, the UE may determine its own buffer status 1218 and determine whether to access a particular LPN based on its buffer status and the received backhaul quality of the LPN. The UE may receive an LDCS from a plurality of LPNs based on the received LDCS configurations from the second entity. When the LDCS for each of the LPNs comprises at least one of backhaul quality information and loading capability information for the corresponding LPN, the UE may determine whether to access any of the plurality of LPNs based on at least one of the received backhaul quality information and the loading capability information for the corresponding LPN in combination with the determined buffer status of the UE.

The UE may also use additional characteristics in its selection of an LPN. For example, the UE may determine whether to access any of a plurality of LPNs by jointly considering any of the backhaul quality of the LPN, the loading capability of the LPN, a received signal strength, a path loss, and a buffer status of the UE in order to determine whether to access a particular LPN.

Once an LPN is selected, the UE transmits an RACH message to the selected LPN 1224 at an RACH delay after receiving the LDCS from the selected LPN. The RACH delay may be received by the UE from the second entity 1208. For example, the LPN may have the RACH delay comprised in the LDCS configuration for the selected LPN. This RACH delay might also be received from the selected LPN 1222. For example, the LPN may have the RACH delay comprised in the LDCS.

The RACH message may also be transmitted to the selected LPN using an RACH configuration linked to the selected LPN after receiving the LDCS from the selected LPN, wherein the RACH configuration is comprised in at least one of the LDCS received from the selected LPN the LDCS configuration received from the selected LPN. By using the RACH configuration linked to the selected LPN, the UE ensures that the LPN will understand which LPN the UE is attempting to reach with the RACH message, or to which LPN the RACH message is intended.

The RACH configuration may be signaled in either the LDCS or the LDCS configuration for a specific LPN. The RACH configuration may relate to, or be tied to, a global cell ID so that when the UE transmits the RACH, the intended LPN knows that the UE is attempting to signal it via a RACH message.

Figure 13:
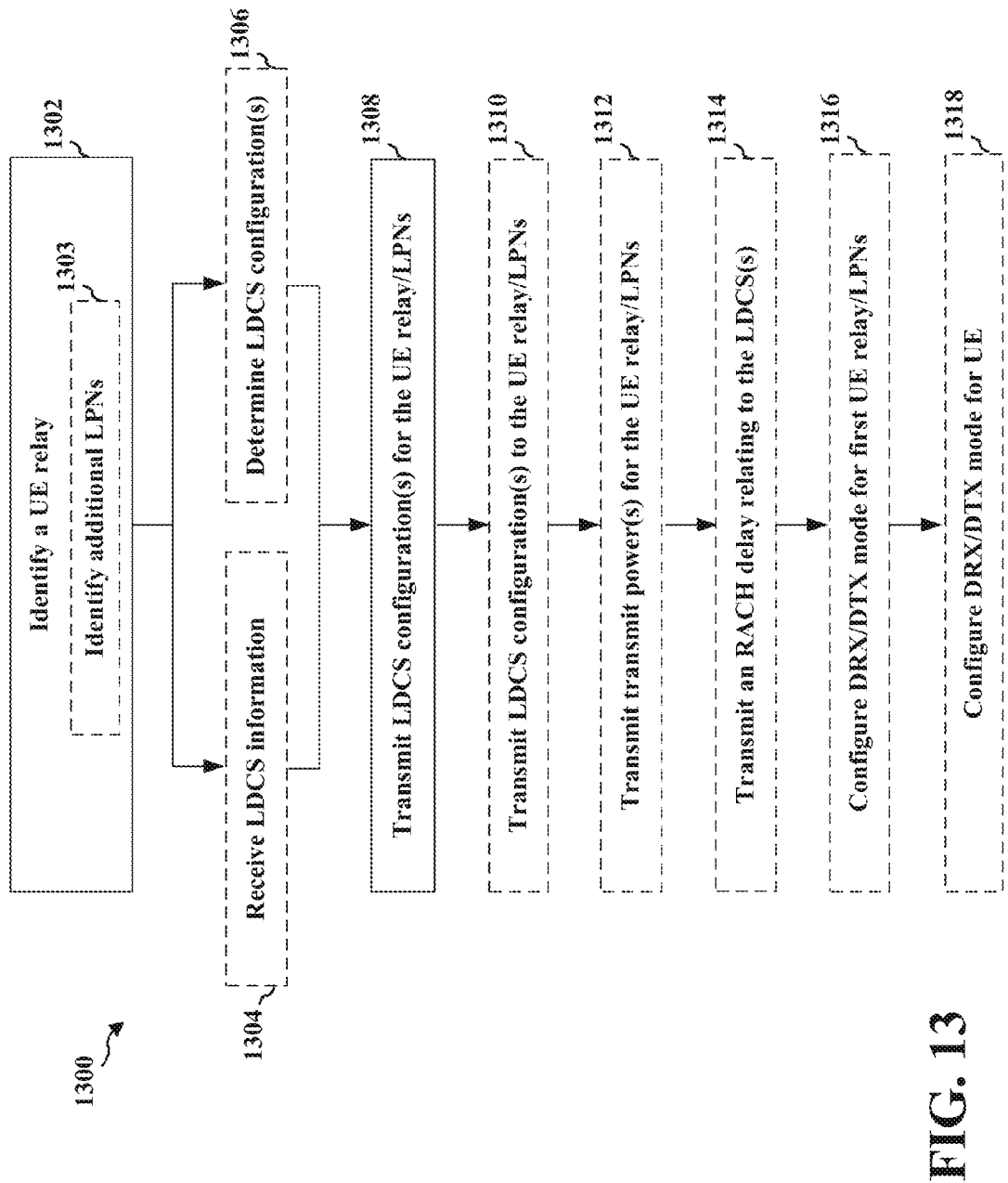
FIG. 13 is a flow chart of a method of wireless communication.

FIG. 13 illustrates a diagram for a method 1300 of communication of LDCS configuration for a UE relay from a second entity. Optional aspects are illustrated with a dashed line. The method is performed by the second entity, which may be another LPN that is not in a dormant state or a Macro cell. The second entity may correspond to the second entity described in connection with FIGS. 12 and 14.

At step 1302 a UE relay is identified. The second entity may also identify additional LPNs at 1303. Thus, the second entity may identify a plurality of LPNs, the plurality of LPNs including the UE relay. As illustrated at 1304 and 1306, LDCS information for the UE relay may either be received by the second entity or configured by the second entity itself. When the LDCS information is received by the second entity, the LDCS configuration is transmitted 1308 after the LDCS information is received 1304. When the second entity configured the LDCS configuration 1306, the second entity also transmits the LDCS configuration to the UE relay 1310.

Potential formats for transmissions of the LDCS and the LDCS configuration may be the same as those described in connection with FIG. 12.

The second entity may transmit a transmit power for the UE relay 1312, e.g., in an SIB/MIB transmission, in order to enable a path loss determination regarding the UE relay.

At step 1314, the cell may transmit an RACH delay relating to the LDCS for the UE relay.

At 1316, the cell may configure a DRX/DTX mode for a backhaul for the UE relay. A DRX/DTX mode related to an additional LPN may be configured, with the DRX/DTX modes for the UE relay and the additional LPN being different in order to provide better multiplexing.

At 1318, a DRX/DTX mode for a UE may be configured, with the DRX/DTX mode for the UE relay and the DRX/DTX mode for the UE being different. The second entity may also configure the backhaul for the UE relay to a DRX/DTX matching an access link DRX/DTX configuration for the UE relay. Additionally, the second entity may configure the backhaul for the UE relay to a DRX/DTX to match an access link DRX/DTX configuration for the UE relay, and may configure the DRX/DTX configuration for the backhaul and the access link DRX/DTX configuration to map to the DRX/DTX configuration for the UE.

The method may further include transmitting a RACH delay to a UE in the LDCS configuration for the UE relay.

In addition to a RACH delay, RACH configuration may be signaled from the macrocell, e.g., in the LDCS configuration for a specific LPN. The RACH configuration may relate to, or be tied to, a global cell ID so that when the UE transmits the RACH, the intended LPN knows that the UE is attempting to signal it via a RACH message.

This enables the UE to transmit a RACH message to a selected LPN, from among a plurality of LPNs, using an RACH configuration linked to the selected LPN after receiving the LDCS from the selected LPN, wherein the RACH configuration is comprised in at least one of the LDCS received from the selected LPN and the LDCS configuration received from the selected LPN. By using the RACH configuration linked to the selected LPN, the UE ensures that the LPN will understand which LPN the UE is attempting to reach with the RACH message, or to which LPN the RACH message is intended.

Figure 14:
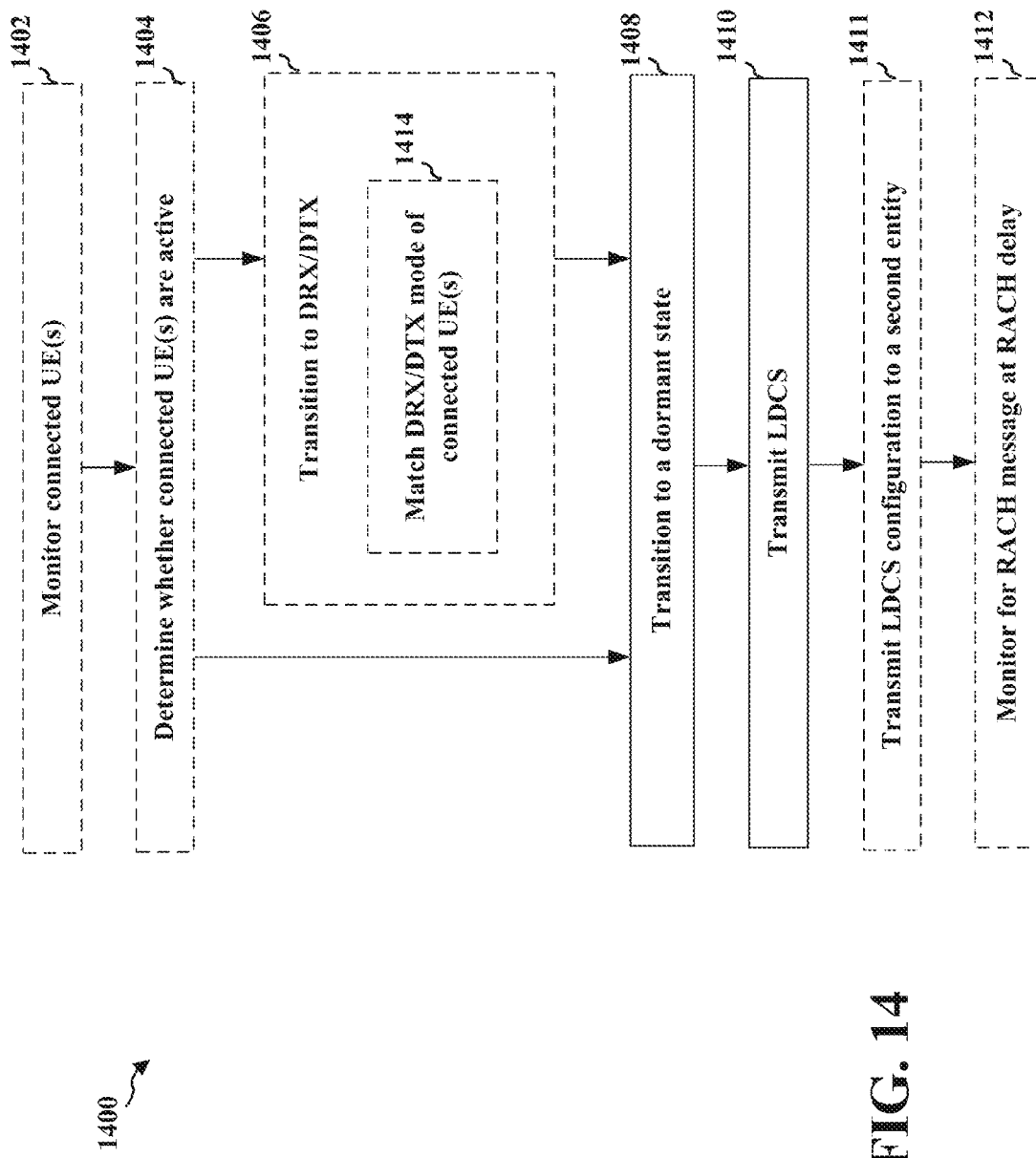
FIG. 14 is a flow chart of a method of wireless communication.

FIG. 14 illustrates a diagram for a method 1400 of wireless communication at a UE relay. Optional aspects are illustrated with a dashed line. The method may be performed by an LPN, as described herein, e.g., by a UE relay. At step 1408, the UE relay transitions to a dormant state. At 1410, the UE relay transmits an LDCS while in the dormant state.

Potential formats for the LDCS are described in connection with FIG. 12. The LDCS may optionally include transmit power information for the LDCS.

The UE relay may transmit an LDCS configuration to a second entity at 1411 so that the second entity may transmit such LDCS configuration information for the UE relay while the UE relay is in the dormant state. The second entity may be, e.g., another LPN that is not in a dormant state and a Macro cell.

At 1412, the UE relay monitors for an RACH message at a predetermined RACH delay after transmitting the LDCS. The predetermined RACH delay may be comprised in the transmitted LDCS or in the LDCS configuration. The LDCS may further comprise at least one of backhaul quality information and loading capability information for the UE relay.

In addition to a RACH delay, a RACH configuration may be signaled in either the LDCS or the LDCS configuration. The RACH configuration may relate to, or be tied to, a global cell ID for the UE relay so that when a UE responds by transmitting the RACH, the intended UE relay knows that the UE is attempting to signal it via a RACH message. In an alternative, the RACH configuration for the UE relay may be signaled to the UE by a second entity.

The transition to the dormant state 1408 may be made directly from an active state and may be performed based at least in part on an expiration of a predetermined period of time. For example, the UE relay may monitor at least one connected UE at 1402. At 1404, the UE relay may then determine whether any connected UE are active. The UE relay performs the transition to the dormant state when no UEs are determined to be active for the predetermined period of time.

When it is determined that the UE relay has no connected, active UEs, the UE relay may transition to a DRX/DTX mode at 1406 before transitioning to the dormant state. Thus, in this situation, the transition to the dormant state is performed from the DRX/DTX mode.

When it is determined that the LPN has no connected, active UEs, the UE relay may transition to the dormant state at the predetermined period of time after determining that no connected UEs are active.

As a part of transitioning to a DRX/DTX mode, the UE relay may match the DRX/DTX mode to a DRX/DTX mode for at least one connected UE at 1414. The UE relay may match the DRX/DTX mode to a DRX/DTX mode for plurality of connected UEs, wherein the DRX/DTX mode for each of the connected UEs is different. The UE relay may match the DRX/DTX mode to a DRX/DTX mode for a plurality of connected UEs, wherein the DRX/DTX mode for each of the connected UEs is the same. Although the DRX/DTX matching have been described using the example of a UE relay, such DRX/DTX matching may also be performed for another type of LPN.

The DRX/DTX mode may comprise a configuration for an access link of the UE relay and a configuration for a backhaul link of the UE relay. The configuration for the access link of the UE relay may match the configuration of the backhaul link of the UE relay. The configuration for the access link of the UE relay may also be different than the configuration of the backhaul link of the UE relay.

Figure 15:
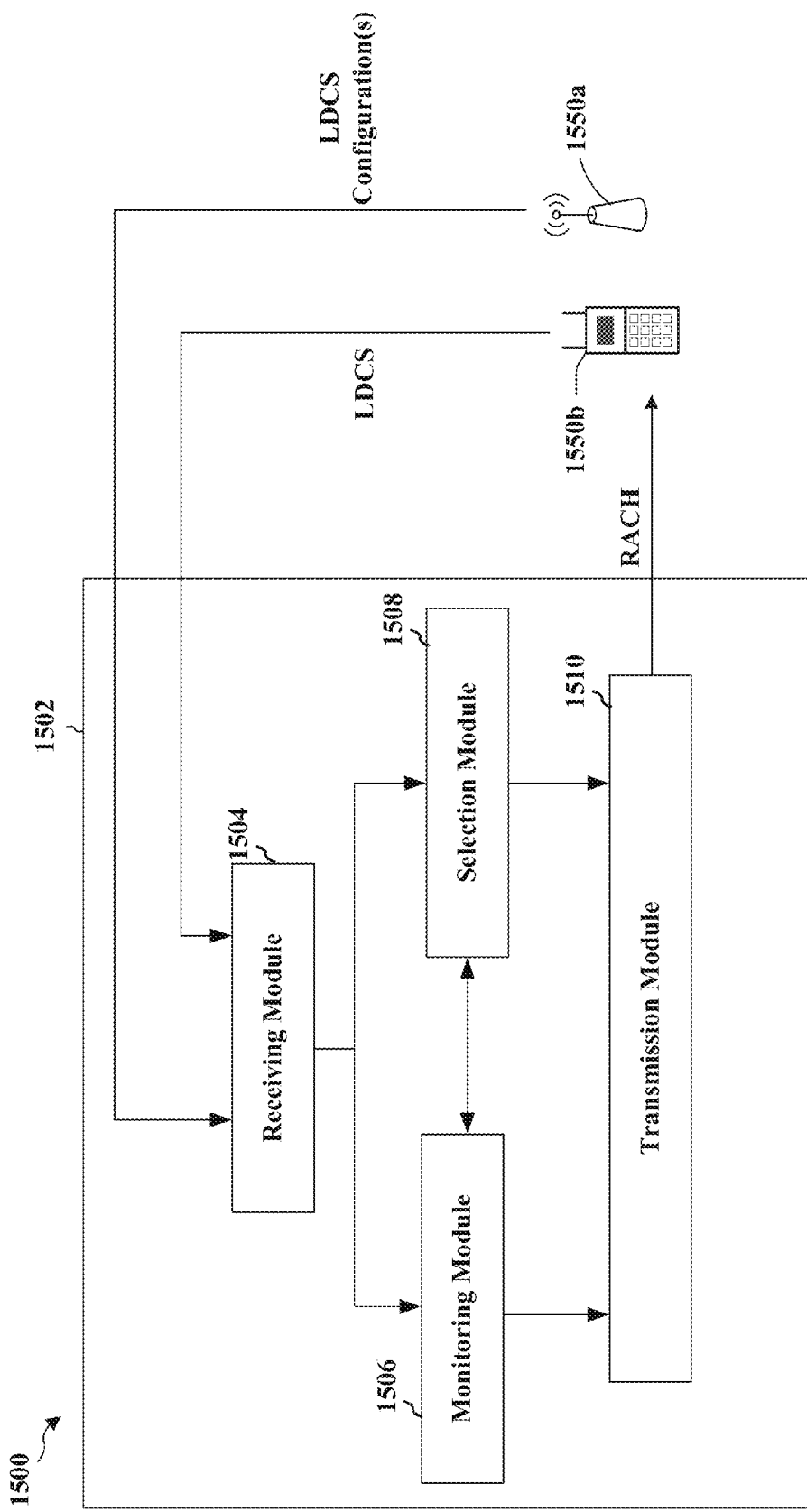
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE, and may be a UE configured to perform any of the steps described in connection with FIG. 12. The apparatus includes a receiving module 1504, a monitoring module 1506, a selection module 1508, and a transmission module 1510.

The receiving module 1504 receives an LDCS configuration for a UE relay 1550a from a second entity, e.g., a cell or another LPN, 1550b. Thus, although not illustrated, the LPN may comprise an LPN such as a RRH or UE relay. The monitoring module 1506 monitors for an LDCS from the UE relay based on the received LDCS configuration. The LDCS will be received by the receiving module 1504 and communicated from the receiving module 1504 to the monitoring module 1506.

Although only a single UE relay 1550a and second 1550b entity are illustrated, the receiving module 1504 may receive LDCS configurations for a plurality of LPNs, the plurality of LPNs include the UE relay, and the monitoring module 1506 may monitor for a plurality of LDCSs from the plurality of LPNs based on the received LDCS configurations.

The selecting module 1508 selects one of the LPNs, e.g., among the plurality of LPNs based on any of the received backhaul quality information, the received loading capability information, a received signal strength, and a path loss for the corresponding LPN. This information may be received from the receiving module or the monitoring module. The selecting module may determine a buffer status at the UE and determine whether to access any of the plurality of LPNs based on at least one of the received backhaul quality information and the loading capability information for the corresponding LPN in combination with the determined buffer status of the UE.

The transmission module transmits, among other things, an RACH message to the selected LPN at an RACH delay after receiving the LDCS from the selected LPN. Thus, based on the output from the selection module, the transmission module transmits the RACH. Additionally, the transmission module 1510 may receive the RACH delay for the transmission, e.g., from the monitoring module 1506. The RACH delay may be signaled to the UE from either the UE relay or the second entity.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
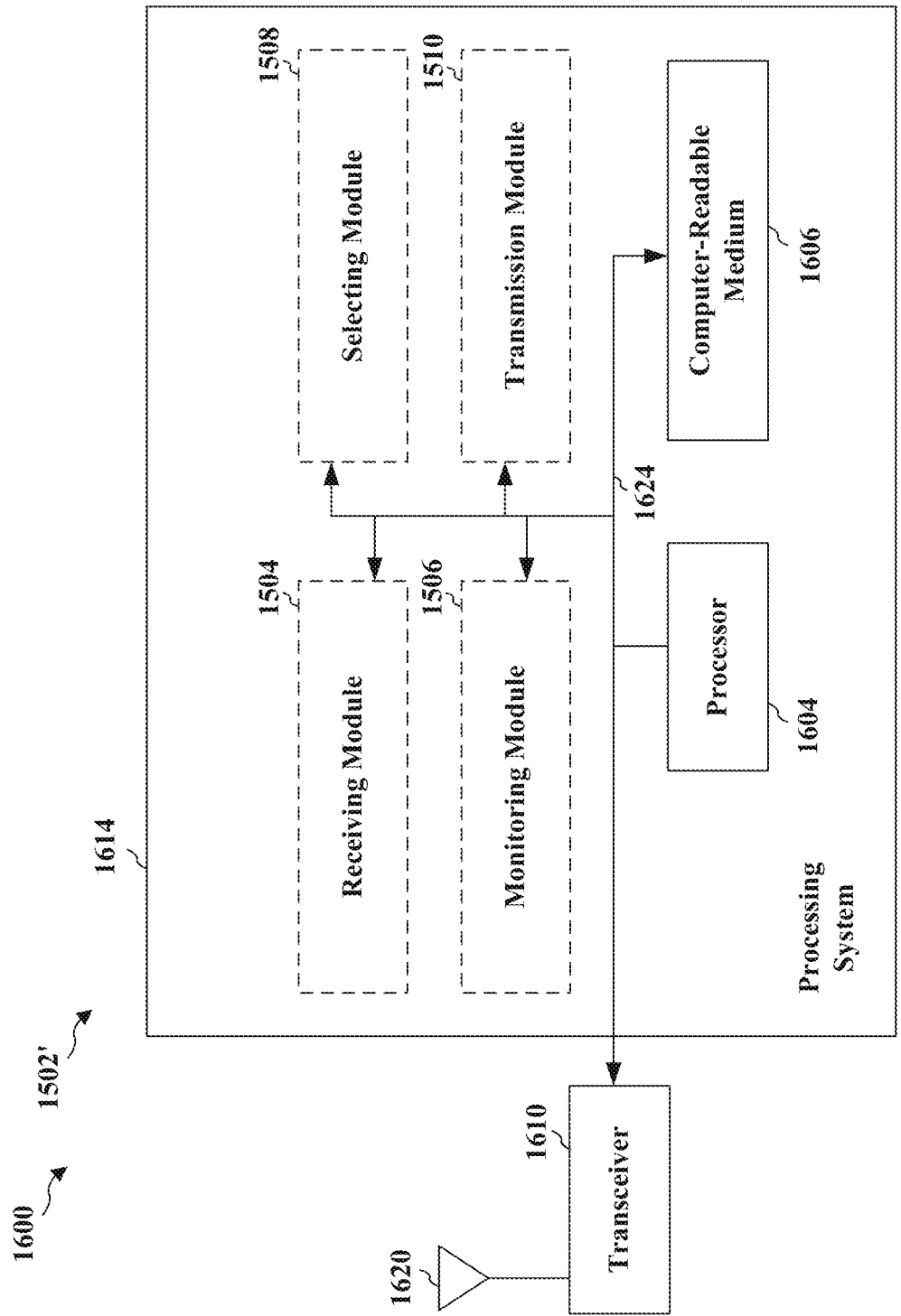
FIG. 16 is a conceptual data flow diagram illustrating the data flow between different modules/means/components in an exemplary apparatus.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510 and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, and 1510. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for means for receiving a very low duty cycle signal (LDCS) configuration for a UE relay from a second entity, means for monitoring for an LDCS from the UE relay based on the received LDCS configuration, means for selecting an LPN among a plurality of LPNs, and means for transmitting an RACH. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
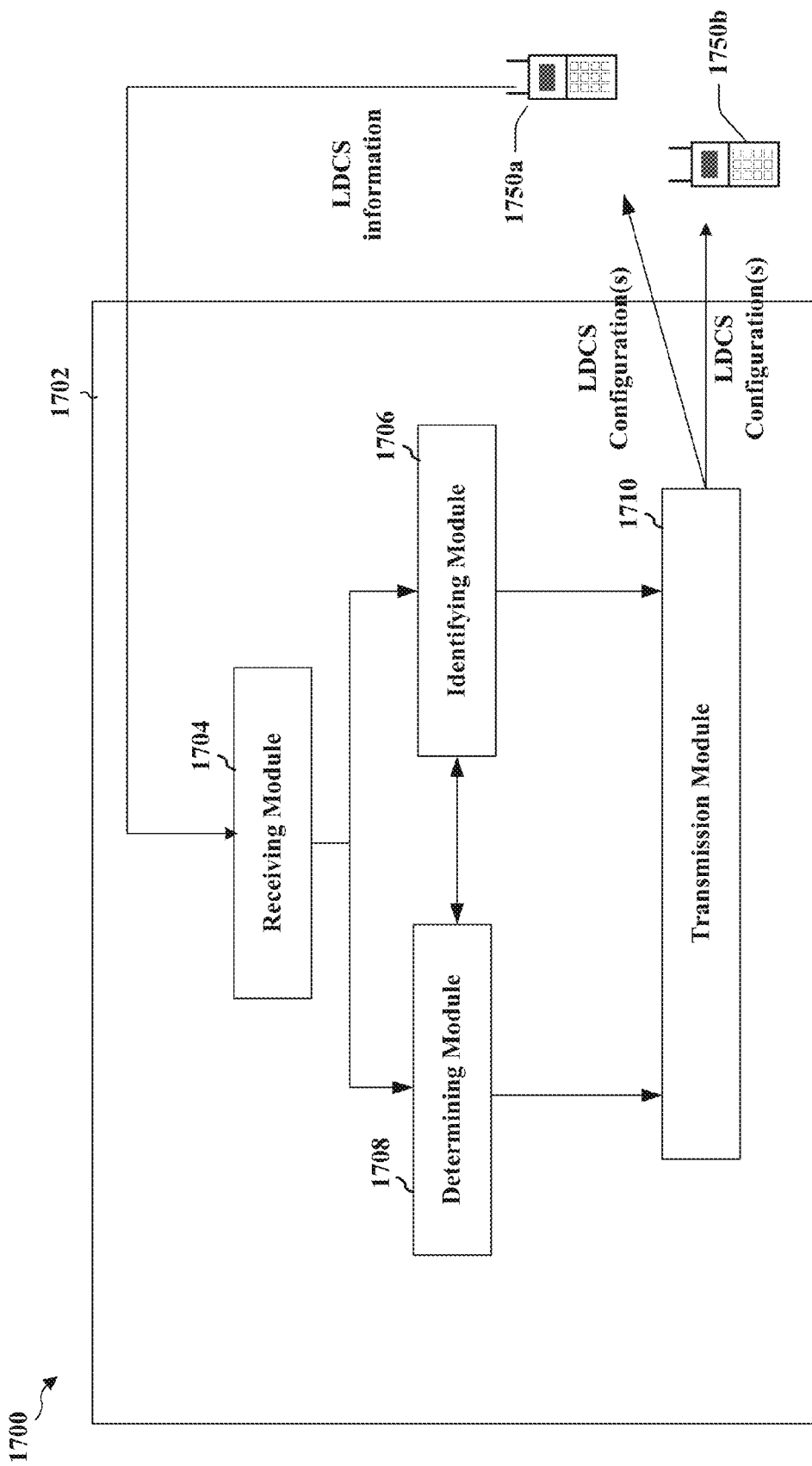
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus transmits an LDCS configuration of a UE relay. Among others, the apparatus may be another LPN that is not in a dormant mode and a cell. The apparatus includes a receiving module 1704, an identifying module 1706, a determining module 1708, and a transmission module 1710.

The identifying module 1706 identifies a UE relay 1750a. The transmission module transmits an LDCS configuration for the UE relay 1750a to a UE 1750b. The LDCS configuration may be based on LDCS information received at the receiving module 1704 regarding the LDCS, or it may be determined at apparatus 1702 itself via the determination module 1708. The transmission module further transmits LDCS configuration to the UE relay 1750a when the apparatus 1702 determines the configuration itself.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
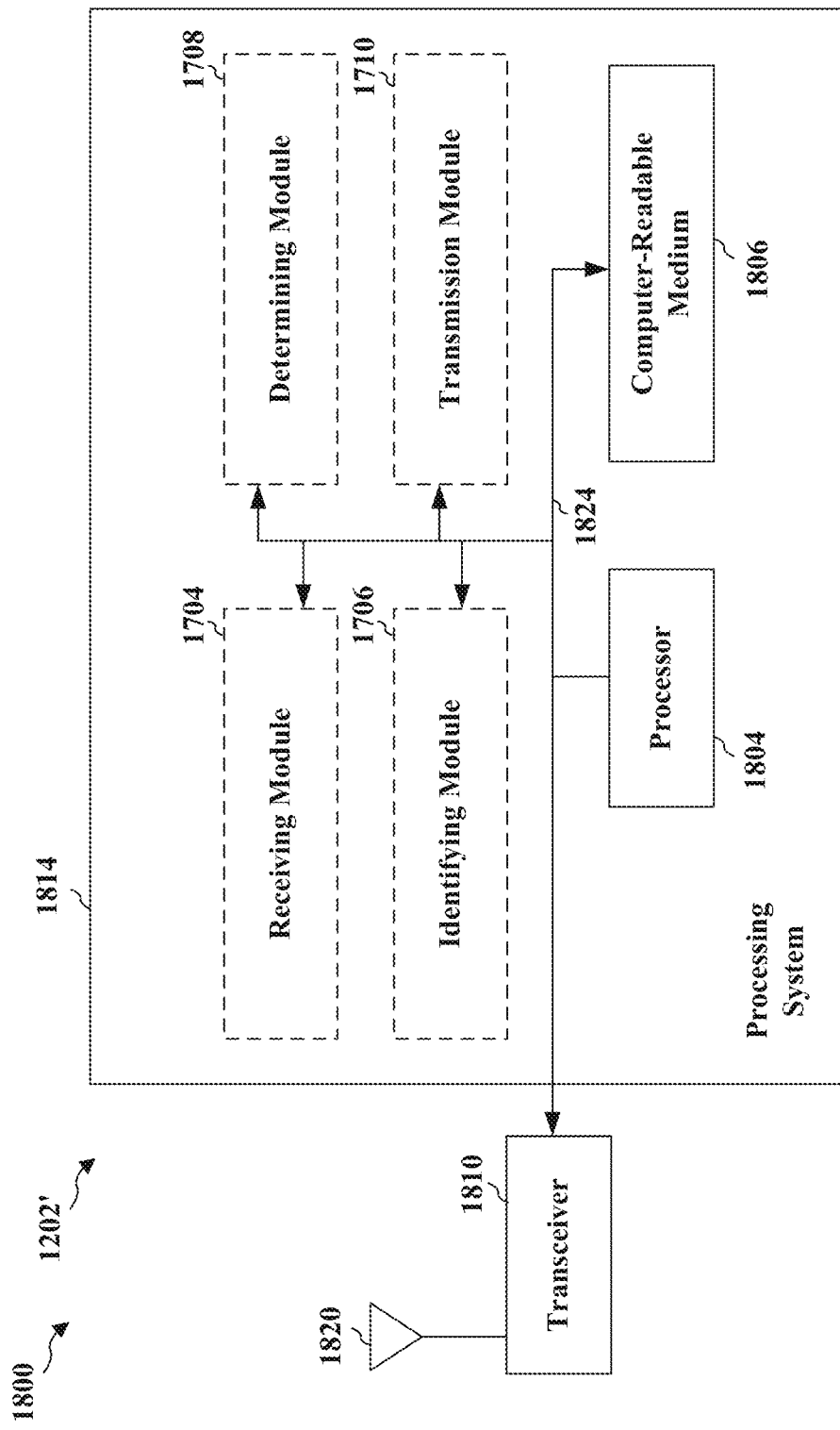
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1704, 1706, 1708, and 1710. The modules may be software modules running in the processor 1804, resident/stored in the computer readable medium 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for means for identifying a UE relay, means for transmitting an LDCS configuration of at least one UE relay, means for receiving LDCS information for the UE relay, and means for determining, among other things, the LDCS configuration. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. The aforementioned means may also be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 19:
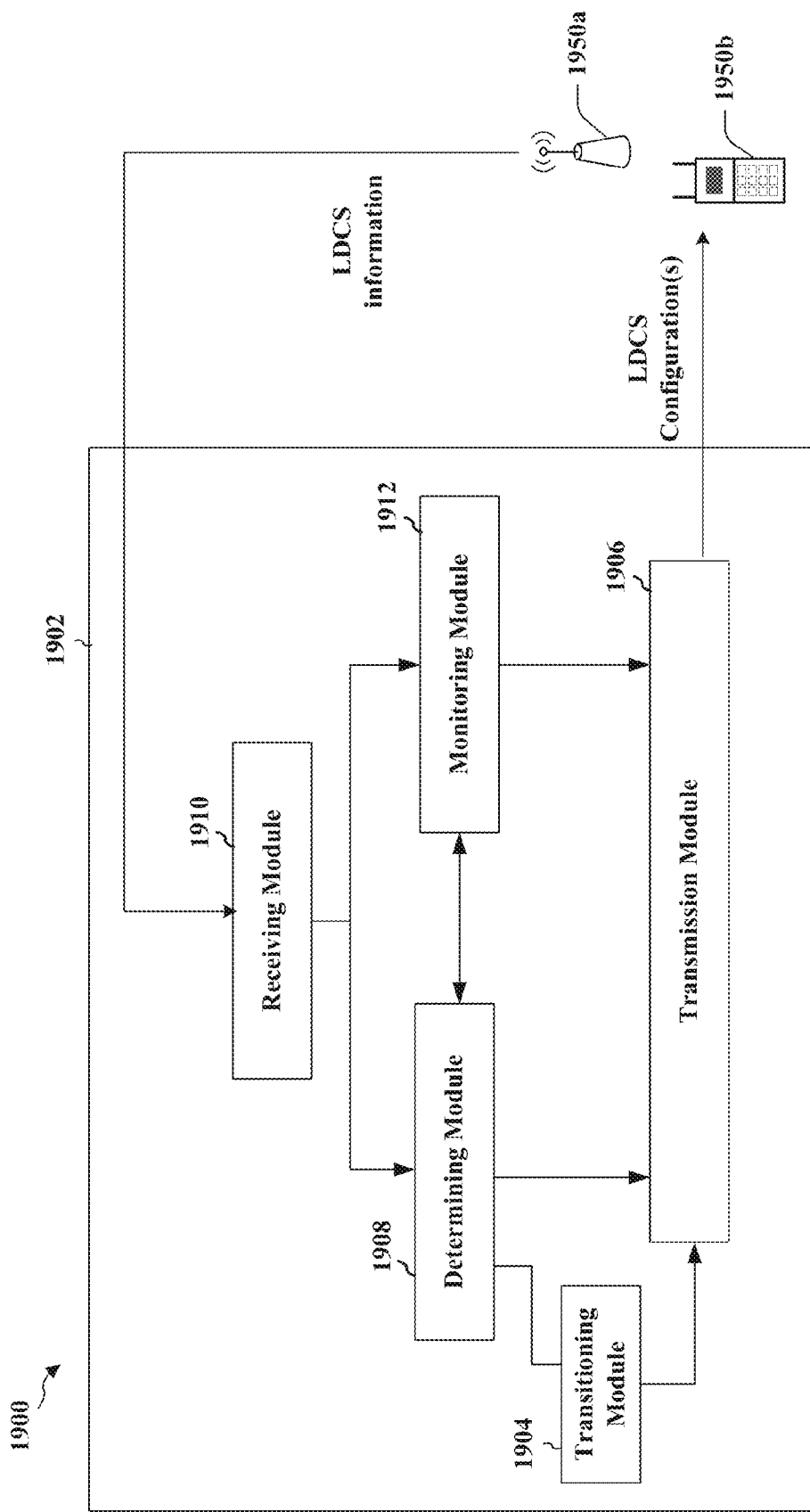
FIG. 19 is a diagram illustrating an example of a hardware implementation for an apparatus employing a processing system.

FIG. 19 is a conceptual data flow diagram 1900 illustrating the data flow between different modules/means/components in an exemplary apparatus 1902. The apparatus may be an LPN, e.g., a UE relay. The apparatus includes a transitioning module 1904, a transmission module 1906, a determining module 1908, a receiving module 1910, and a monitoring module 1912.

The transitioning module 1904 transitions the UE relay to a different state, such as a dormant state. The transitioning module may also transition the UE relay to an active state and to a DRX/DTX state. The transmission module 1906 transmits an LDCS while the UE relay is in the dormant state. The monitoring module 1912 monitors for an RACH message, e.g., at a predetermined RACH delay, and monitors UE associated with the UE relay. For example, the monitoring module monitors any connected UEs and any active UEs. The determining module 1908 determines the connection and/or active status of UEs for the UE relay. The determining module also matches the DRX/DTX mode to other DRX/DTX modes.

The apparatus may include additional modules that perform each of the steps of the algorithm in the aforementioned flow charts of FIG. 14. As such, each step in the aforementioned flow charts of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
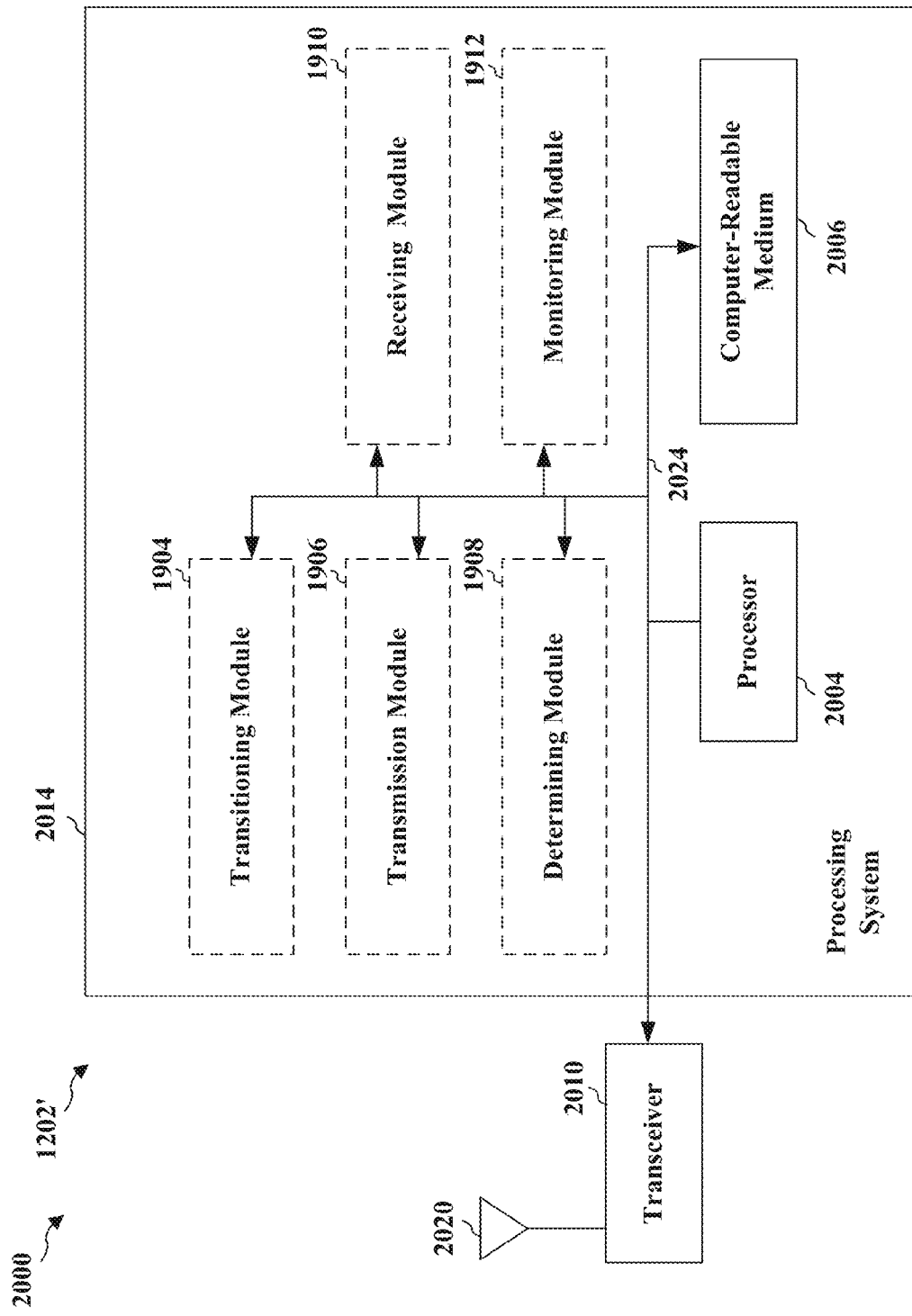
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, 1912, and the computer-readable medium 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The processing system 2014 includes a processor 2004 coupled to a computer-readable medium 2006. The processor 2004 is responsible for general processing, including the execution of software stored on the computer-readable medium 2006. The software, when executed by the processor 2004, causes the processing system 2014 to perform the various functions described supra for any particular apparatus. The computer-readable medium 2006 may also be used for storing data that is manipulated by the processor 2004 when executing software. The processing system further includes at least one of the modules 1904, 1906, 1908, 1910, and 1912. The modules may be software modules running in the processor 2004, resident/stored in the computer readable medium 2006, one or more hardware modules coupled to the processor 2004, or some combination thereof. The processing system 2014 may be a component of the eNB 610 and may include the memory 676 and/or at least one of the TX processor 616, the RX processor 670, and the controller/processor 675. The processing system 2014 may be a component of the UE 650 and may include the memory 660 and/or at least one of the TX processor 668, the RX processor 656, and the controller/processor 659.

In one configuration, the apparatus 1902/1902' for wireless communication includes means for means for transitioning to a dormant state, means for transmitting an LDCS while in the dormant state, means for monitoring for a RACH message at a predetermined RACH delay after transmitting the LDCS, means for monitoring at least one connected UE, means for determining whether any connected UE is active, and means for matching the DRX/DTX mode of the UE relay to a DRX/DTX mode for at least one connected UE. The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. The aforementioned means may also be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a low power node (LPN), comprising:
   determining that no connected UEs of the LPN are active;
   transitioning from an active state to a discontinuous reception and transmission (DRX/DTX) state, when it is determined that no connected UEs of the LPN are active;
   transitioning to a dormant state, wherein the transition to the dormant state is performed from the DRX/DTX state; and
   transmitting a very low duty cycle signal (LDCS) while in the dormant state, wherein transmissions of the LDCS in the dormant state have a lower duty cycle than discontinuous transmissions transmitted in the DRX/DTX state.

2. The method of claim 1, further comprising:
   transmitting an LDCS configuration to a second entity, wherein the second entity comprises one of an LPN that is not in a dormant state and a Macro cell.

3. The method of claim 1, wherein the format of the LDCS comprises at least one of a special synchronization signal format, an enhanced cell-specific reference signal (CRS) format, a coded signal transmission format, a channel state information reference signal (CSI-RS) format, and a system information block (SIB) format.

4. The method of claim 1, wherein the LDCS configuration comprises transmit power information for the LDCS.

5. A method of wireless communication at a low power node (LPN), comprising:
   transitioning to a dormant state;
   transmitting a very low duty cycle signal (LDCS) while in the dormant state; and
   monitoring for a Random Access Channel (RACH) message at a predetermined RACH configuration after transmitting the LDCS.

6. The method of claim 5, wherein the predetermined RACH configuration is comprised in at least one of the transmitted LDCS and the LDCS configuration.

7. The method of claim 6, wherein at least one of the LDCS and the LDCS configuration further comprises RACH configuration, wherein the RACH configuration relates to a global cell ID.

8. The method of claim 1, wherein the LDCS further comprises at least one of backhaul quality information and loading capability information for the LPN.

9. The method of claim 5, wherein the transition to the dormant state is made from an active state, and wherein the transition is performed based at least in part on an expiration of a predetermined period of time.

10. The method of claim 9, further comprising:
    monitoring at least one connected user equipment (UE); and
    determining whether any connected UE is active, wherein the transition to the dormant state is performed when no UEs are determined to be active for the predetermined period of time.

11. The method of claim 10, further comprising:
    determining that no connected UEs of the LPN are active; and
    when it is determined that no connected UEs of the LPN are active, transitioning to a discontinuous reception and transmission (DRX/DTX) mode, wherein the transition to the dormant state is performed from the DRX/DTX mode.

12. The method of claim 1, further comprising:
    determining that no connected UEs are active, wherein the LPN transitions to the dormant state at the predetermined period of time after determining that no connected UEs are active.

13. The method of claim 1, further comprising:
    matching the DRX/DTX mode of the LPN to a DRX/DTX mode for at least one connected UE.

14. The method of claim 1, further comprising:
    matching the DRX/DTX mode of the LPN to a DRX/DTX mode for plurality of connected UEs, wherein the DRX/DTX mode for each of the connected UEs is different.

15. The method of claim 1, further comprising:
    matching the DRX/DTX mode of the LPN to a DRX/DTX mode for a plurality of connected UEs, wherein the DRX/DTX mode for each of the connected UEs is the same.

16. The method of claim 1, wherein the DRX/DTX mode comprises a configuration for an access link of the LPN and a configuration for a backhaul link of the LPN.

17. The method of claim 16, wherein the configuration for the access link of the LPN matches the configuration of the backhaul link of the LPN.

18. The method of claim 16, wherein the configuration for the access link of the LPN is different than the configuration of the backhaul link of the LPN.

19. An apparatus for wireless communication at a low power node (LPN), comprising:
    means for determining that no connected UEs of the LPN are active;
    means for transitioning from an active state to a discontinuous reception and transmission (DRX/DTX) state when it is determined that no connected UEs of the LPN are active and to a dormant state from the DRX/DTX state; and
    means for transmitting a very low duty cycle signal (LDCS) while in the dormant state, wherein transmissions of the LDCS in the dormant state have a lower duty cycle than discontinuous transmissions transmitted in the DRX/DTX state.

20. The apparatus of claim 19, wherein the means for transmitting transmit an LDCS configuration to a second entity, wherein the second entity comprises one of a low power node (LPN) that is not in a dormant state and a Macro cell.

21. The apparatus of claim 19, wherein the format of the LDCS comprises at least one of a special synchronization signal format, an enhanced cell-specific reference signal (CRS) format, a coded signal transmission format, a channel state information reference signal (CSI-RS) format, and a system information block (SIB) format.

22. The apparatus of claim 19, wherein the LDCS configuration comprises transmit power information for the LDCS.

23. An apparatus for wireless communication, comprising:
means for transitioning to a dormant state; and
means for transmitting a very low duty cycle signal (LDCS) while in the dormant state; and
means for monitoring for a Random Access Channel (RACH) message at a predetermined RACH configuration after transmitting the LDCS.

24. The apparatus of claim 23, wherein the predetermined RACH configuration is comprised in at least one of the transmitted LDCS and the LDCS configuration.

25. The apparatus of claim 24, wherein at least one of the LDCS and the LDCS configuration further comprises RACH configuration, wherein the RACH configuration relates to a global cell ID.

26. The apparatus of claim 19, wherein the LDCS further comprises at least one of backhaul quality information and loading capability information for the apparatus.

27. The apparatus of claim 23, wherein the transition to the dormant state is made from an active state, and wherein the transition is performed based at least in part on an expiration of a predetermined period of time.

28. The apparatus of claim 27, further comprising:
means for monitoring at least one connected user equipment (UE); and
means for determining whether any connected UE is active, wherein the transition to the dormant state is performed when no UEs are determined to be active for the predetermined period of time.

29. The apparatus of claim 28, wherein when it is determined that no connected UEs of the apparatus are active, the means for transitioning transition to a discontinuous reception and transmission (DRX/DTX) mode, wherein the transition to the dormant state is performed from the DRX/DTX mode.

30. The apparatus of claim 19, wherein the apparatus transitions to the dormant state at the predetermined period of time after determining that no connected UEs are active.

31. The apparatus of claim 19, wherein the means for transitioning match the DRX/DTX mode of the apparatus to a DRX/DTX mode for at least one connected UE.

32. The apparatus of claim 19, wherein the means for transitioning match the DRX/DTX mode of the apparatus to a DRX/DTX mode for plurality of connected UEs, wherein the DRX/DTX mode for each of the connected UEs is different.

33. The apparatus of claim 19, wherein the means for transitioning match the DRX/DTX mode of the apparatus to a DRX/DTX mode for a plurality of connected UEs, wherein the DRX/DTX mode for each of the connected UEs is the same.

34. The apparatus of claim 19, wherein the DRX/DTX mode comprises a configuration for an access link of the apparatus and a configuration for a backhaul link of the apparatus.

35. The apparatus of claim 34, wherein the configuration for the access link of the apparatus matches the configuration of the backhaul link of the apparatus.

36. The apparatus of claim 34, wherein the configuration for the access link of the apparatus is different than the configuration of the backhaul link of the apparatus.

37. An apparatus for wireless communication at a low power node (LPN), comprising:
a memory;
at least one non-transitory processor coupled to the memory and configured to:
determine that no connected UEs of the LPN are active;
transition from an active state to a discontinuous reception and transmission (DRX/DTX) state, when it is determined that no connected UEs of the LPN are active;
transition to a dormant state from the DRX/DTX state; and
transmit a very low duty cycle signal (LDCS) while in the dormant state, wherein transmissions of the LDCS in the dormant state have a lower duty cycle than discontinuous transmissions transmitted in the DRX/DTX state.

38. The apparatus of claim 37, wherein the at least one non-transitory processor is further configured to:
transmit an LDCS configuration to a second entity, wherein the second entity comprises one of a low power node (LPN) that is not in a dormant state and a Macro cell.

39. The apparatus of claim 37, wherein the format of the LDCS comprises at least one of a special synchronization signal format, an enhanced cell-specific reference signal (CRS) format, a coded signal transmission format, a channel state information reference signal (CSI-RS) format, and a system information block (SIB) format.

40. The apparatus of claim 37, wherein the LDCS configuration comprises transmit power information for the LDCS.

41. An apparatus for wireless communication, comprising:
a memory;
at least one non-transitory processor coupled to the memory and configured to:
transition to a dormant state;
transmit a very low duty cycle signal (LDCS) while in the dormant state; and
monitor for a Random Access Channel (RACH) message at a predetermined RACH configuration after transmitting the LDCS.

42. The apparatus of claim 41, wherein the predetermined RACH configuration is comprised in at least one of the transmitted LDCS and the LDCS configuration.

43. The apparatus of claim 42, wherein at least one of the LDCS and the LDCS configuration further comprises RACH configuration, wherein the RACH configuration relates to a global cell ID.

44. The apparatus of claim 37, wherein the LDCS further comprises at least one of backhaul quality information and loading capability information for the apparatus.

45. The apparatus of claim 41, wherein the transition to the dormant state is made from an active state, and wherein the transition is performed based at least in part on an expiration of a predetermined period of time.

46. The apparatus of claim 45, wherein the at least one non-transitory processor is further configured to:
- monitor at least one connected user equipment (UE); and
- determine whether any connected UE is active, wherein the transition to the dormant state is performed when no UEs are determined to be active for the predetermined period of time.

47. The apparatus of claim 46, wherein the at least one non-transitory processor is further configured to:
- determine that no connected UEs of the apparatus are active; and
- when it is determined that no connected UEs of the apparatus are active, transition to a discontinuous reception and transmission (DRX/DTX) mode, wherein the transition to the dormant state is performed from the DRX/DTX mode.

48. The apparatus of claim 37, wherein the at least one non-transitory processor is further configured to:
- determine that no connected UEs are active, wherein the apparatus transitions to the dormant state at the predetermined period of time after determining that no connected UEs are active.

49. The apparatus of claim 37, wherein the at least one non-transitory processor is further configured to:
- match the DRX/DTX mode of the apparatus to a DRX/DTX mode for at least one connected UE.

50. The apparatus of claim 37, wherein the at least one non-transitory processor is further configured to:
- match the DRX/DTX mode of the apparatus to a DRX/DTX mode for plurality of connected UEs, wherein the DRX/DTX mode for each of the connected UEs is different.

51. The apparatus of claim 37, wherein the at least one non-transitory processor is further configured to:
- match the DRX/DTX mode of the apparatus to a DRX/DTX mode for a plurality of connected UEs, wherein the DRX/DTX mode for each of the connected UEs is the same.

52. The apparatus of claim 37, wherein the DRX/DTX mode comprises a configuration for an access link of the apparatus and a configuration for a backhaul link of the apparatus.

53. The apparatus of claim 52, wherein the configuration for the access link of the apparatus matches the configuration of the backhaul link of the apparatus.

54. The apparatus of claim 52, wherein the configuration for the access link of the apparatus is different than the configuration of the backhaul link of the apparatus.

55. A non-transitory computer-readable medium storing computer executable code for wireless communication at a low power node (LPN), comprising code for:
- determining that no connected UEs of the LPN are active;
- transitioning from an active state to a discontinuous reception and transmission (DRX/DTX) state, when it is determined that no connected UEs of the LPN are active;
- transitioning to a dormant state, wherein the transition to the dormant state is performed from the DRX/DTX state; and
- transmitting a very low duty cycle signal (LDCS) while in the dormant state, wherein transmissions of the LDCS in the dormant state have a lower duty cycle than discontinuous transmissions transmitted in the DRX/DTX state.

56. The computer-readable medium of claim 55, further comprising code for:
- transmitting an LDCS configuration to a second entity, wherein the second entity comprises one of a low power node (LPN) that is not in a dormant state and a Macro cell.

57. The computer-readable medium of claim 55, wherein the format of the LDCS comprises at least one of a special synchronization signal format, an enhanced cell-specific reference signal (CRS) format, a coded signal transmission format, a channel state information reference signal (CSI-RS) format, and a system information block (SIB) format.

58. The computer-readable medium of claim 55, wherein the LDCS configuration comprises transmit power information for the LDCS.

59. A non-transitory computer-readable medium storing computer executable code for wireless communication, comprising code for:
- transitioning to a dormant state;
- transmitting a very low duty cycle signal (LDCS) while in the dormant state; and
- monitoring for a Random Access Channel (RACH) message at a predetermined RACH configuration after transmitting the LDCS.

60. The computer-readable medium of claim 59, wherein the predetermined RACH configuration is comprised in at least one of the transmitted LDCS and the LDCS configuration.

61. The computer-readable medium of claim 60, wherein at least one of the LDCS and the LDCS configuration further comprises RACH configuration, wherein the RACH configuration relates to a global cell ID.

62. The computer-readable medium of claim 55, wherein the LDCS further comprises at least one of backhaul quality information and loading capability information for an LPN.

63. The computer-readable medium of claim 59, wherein the transition to the dormant state is made from an active state, and wherein the transition is performed based at least in part on an expiration of a predetermined period of time.

64. The computer-readable medium of claim 63, further comprising code for:
- monitoring at least one connected user equipment (UE); and
- determining whether any connected UE is active, wherein the transition to the dormant state is performed when no UEs are determined to be active for the predetermined period of time.

65. The computer-readable medium of claim 64, further comprising code for:
- determining that no connected UEs of a low power node (LPN) are active; and
- when it is determined that no connected UEs of the LPN are active, transitioning to a discontinuous reception and transmission (DRX/DTX) mode, wherein the transition to the dormant state is performed from the DRX/DTX mode.

66. The computer-readable medium of claim 55, further comprising code for:
- determining that no connected UEs are active, wherein the LPN transitions to the dormant state at the predetermined period of time after determining that no connected UEs are active.

67. The computer-readable medium of claim 55, further comprising code for:
- matching the DRX/DTX mode of the LPN to a DRX/DTX mode for at least one connected UE.

68. The computer-readable medium of claim 55, further comprising code for:
- matching the DRX/DTX mode of the LPN to a DRX/DTX mode for plurality of connected UEs, wherein the DRX/DTX mode for each of the connected UEs is different.

69. The computer-readable medium of claim 55, further comprising code for:
   matching the DRX/DTX mode of the LPN to a DRX/DTX mode for a plurality of connected UEs, wherein the DRX/DTX mode for each of the connected UEs is the same.

70. The computer-readable medium of claim 55, wherein the DRX/DTX mode comprises a configuration for an access link of the LPN and a configuration for a backhaul link of the LPN.

71. The computer-readable medium of claim 70, wherein the configuration for the access link of the LPN matches the configuration of the backhaul link of the LPN.

72. The computer-readable medium of claim 70, wherein the configuration for the access link of the LPN is different than the configuration of the backhaul link of the LPN.

* * * * *